US012785113B2

(12) United States Patent
Lee et al.

(10) Patent No.: US 12,785,113 B2
(45) Date of Patent: Nov. 3, 2026

(54) METHOD FOR PREPARING PLATINUM ALLOY CATALYST USING OXIDE COATING

(71) Applicant: KOREA INSTITUTE OF ENERGY RESEARCH, Daejeon (KR)

(72) Inventors: Eun Jik Lee, Sejong-si (KR); Gu-gon Park, Daejeon (KR); DongJe Lee, Cheongju-si (KR); Sung-dae Yim, Daejeon (KR); Seok-hee Park, Daejeon (KR); Min-jin Kim, Daejeon (KR); Young-jun Sohn, Daejeon (KR); Byungchan Bae, Daejeon (KR); Seung-gon Kim, Daejeon (KR); Dongwon Shin, Sejong-si (KR); Hwanyeong Oh, Daejeon (KR); Seung Hee Woo, Daejeon (KR); So Jeong Lee, Daejeon (KR); Hyejin Lee, Daejeon (KR); Yoon Young Choi, Sejong-si (KR); Yun Sik Kang, Seongnam-si (KR); Won-yong Lee, Daejeon (KR); Tae-hyun Yang, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 719 days.

(21) Appl. No.: 18/188,740

(22) Filed: Mar. 23, 2023

(65) Prior Publication Data

US 2023/0402619 A1 Dec. 14, 2023

(30) Foreign Application Priority Data

Jun. 9, 2022 (KR) ........................ 10-2022-0070257

(51) Int. Cl.
*H01M 4/86* (2006.01)
*H01M 4/90* (2006.01)
*H01M 4/92* (2006.01)

(52) U.S. Cl.
CPC ......... *H01M 4/921* (2013.01); *H01M 4/8652* (2013.01); *H01M 4/9016* (2013.01)

(58) Field of Classification Search
CPC . H01M 4/8652; H01M 4/9016; H01M 4/9502
See application file for complete search history.

(56) References Cited

U.S. PATENT DOCUMENTS

2022/0416260 A1* 12/2022 Wu ..................... H01M 4/8882

FOREIGN PATENT DOCUMENTS

CN 108448127 A * 8/2018 ............. B82Y 30/00
CN 113540481 A * 10/2021 ............ H01M 4/921
(Continued)

OTHER PUBLICATIONS

Machine translatin of Park et al. (KR2019/0063292), Jun. 7, 2019.*
(Continued)

*Primary Examiner* — Jun Li
(74) *Attorney, Agent, or Firm* — Rabin & Berdo, P.C.

(57) ABSTRACT

A method for preparing a platinum alloy catalyst using an oxide coating according to an embodiment of the present disclosure comprises: a first step of preparing a dispersion by mixing a commercial platinum catalyst and a transition metal precursor with a solvent; a second step of preparing a catalyst by putting an ultrasonic tip into the dispersion prepared through the first step and performing an ultrasonic process; a third step of performing a primary heat treatment process on the catalyst prepared through the second step; a fourth step of performing an acid treatment process on the catalyst that has undergone the primary heat treatment process through the third step; and a fifth step of preparing
(Continued)

a platinum alloy catalyst by performing a secondary heat treatment process on the catalyst that has undergone the acid treatment process through the fourth step.

7 Claims, 16 Drawing Sheets

(56) References Cited

FOREIGN PATENT DOCUMENTS

| | | | | | |
|---|---|---|---|---|---|
| CN | 114068969 | A | * | 2/2022 | ............ H01M 4/921 |
| CN | 114597431 | A | * | 6/2022 | .......... H01M 4/9083 |
| JP | 2013098091 | A | * | 5/2013 | |
| KR | 10-1294100 | B1 | | 8/2013 | |
| KR | 10-1492102 | B1 | | 2/2015 | |
| KR | 20190063292 | A | | 6/2019 | |
| KR | 20190077736 | A | | 7/2019 | |
| KR | 20200053431 | A | | 5/2020 | |
| KR | 10-2022-0033545 | A | | 3/2022 | |
| KR | 10-2022-0033546 | A | | 3/2022 | |
| KR | 10-2022-0033547 | A | | 3/2022 | |
| KR | 10-2022-0033548 | A | | 3/2022 | |
| KR | 10-2022-0033549 | A | | 3/2022 | |

OTHER PUBLICATIONS

Machine translatin of Guo (CN114597431), Jun. 7, 2022.*
Machine translation of Lee (KR2020/0053431), May 18, 2020.*
Machine translation of Hua (CN113540481), Oct. 22, 2021.*
Machine translation of JP2013098091, May 20, 2013.*
Machine translation of CN114068969, Feb. 18, 2022.*
Machine translation of CN 108448127, Aug. 24, 2018.*
Gatalo et al., A Double-Passivation Water-Based Galvanic Displacement Method for Reproducible Gram-Scale Production of High-Performance Platinum-Alloy Electrocatalysts, Angew. Chem. Int. Ed. 2019, 58, 13266-13270.*
Heizmann et al., Alternative and facile production pathway towards obtaining high surface area PtCo/C intermetallic catalysts for improved PEM fuel cell performance, RSC Adv., 2023, 13, 4601-4611.*
Pavko et al., Toward the Continuous Production of Multigram Quantities of Highly Uniform Supported Metallic Nanoparticles and Their Application for Synthesis of Superior Intermetallic Pt-Alloy ORR Electrocatalysts; ACS Appl. Energy Mater. 2021, 4, 13819-13829.*

* cited by examiner

METHOD FOR PREPARING PLATINUM ALLOY CATALYST USING OXIDE COATING

CROSS-REFERENCE TO RELATED APPLICATIONS

This application claims the priority of Korean Patent Application No. 10-2022-0070257 filed on Jun. 9, 2022, in the Korean Intellectual Property Office, the disclosure of which is incorporated herein by reference.

BACKGROUND

Field

The present disclosure relates to a method for preparing a platinum alloy catalyst using an oxide coating.

Description of the Related Art

Although research for fuel cell development has been conducted for several decades until recently, the high cost of a platinum catalyst used as a fuel cell electrode and the degradation of durability due to corrosion and drop-off of the catalyst as the reaction proceeds account for the largest part of the reason why commercialization is difficult. In order to solve this problem, research for improving the performance and durability of a catalyst for a fuel cell has been conducted in various ways. That is, although various researches, such as attaching a specific functional group (such as nitrogen) to a carbon support on which a platinum catalyst is supported, or forming an alloy between platinum particles and other metals, have been conducted, any research results have not been presented so far.

To date, platinum has shown the most excellent performance as an electrode catalyst for a fuel cell, and research on the addition of various secondary metals based on the platinum catalyst has been conducted. That is, in order to reduce poisoning of the catalyst due to a trace amount of carbon monoxide (CO) present in the fuel in the fuel electrode (anode), research of adding ruthenium (Ru), tin (Sn), molybdenum (Mo), etc. to the platinum catalyst has been conducted. In the case of the oxygen reduction reaction (ORR) that proceeds at the air electrode (cathode), since the reaction occurs very slowly compared to the hydrogen oxidation reaction that occurs at the anode, it acts as a main cause of reducing the performance of the fuel cell.

Therefore, in order to increase the ORR rate, research on alloy catalysts such as Pt—Co, Pt—Cu, Pt—Co—Cu, Pt—Pd, etc., in which cobalt (Co), copper (Cu), or palladium (Pd) is used together based on a platinum catalyst, is being actively conducted, and research of synthesizing and using these metals in their own core-shell structure had also been conducted.

In this regard, a technique of a method for preparing an alloy catalyst for a fuel cell has been conventionally disclosed.

Conventional Art 1 relates to a method for preparing an alloy catalyst for a fuel cell, which is suitable for mass production and is capable of reducing the preparation cost, and is configured by including the steps of: vaporizing two or more catalyst precursors in a separate vaporizer; supplying two or more vaporized catalyst precursors to a reactor without contacting with each other; and synthesizing an alloy catalyst in the reactor. In addition, the method for preparing an alloy catalyst for a fuel cell of Conventional Art 1 not only prepares an alloy catalyst in a single reaction process compared to the conventional complex multi-step catalyst preparation method, but also forms an alloy at a significantly lower temperature than the conventional alloy manufacturing process so that it is suitable for mass production and has the effect capable of reducing process costs. In addition, since the size of alloy catalyst particles prepared according to Conventional Art 1 is significantly small as nanoscale compared to catalyst particles prepared by the conventional method, the number of reaction active points may be greatly improved to reduce catalyst cost due to nanoization, and the interaction between the metal catalyst and the support may be increased to obtain various effects such as improved durability.

Meanwhile, Conventional Art 2 relates to a method for preparing a hybrid alloy catalyst by sequential melt impregnation and the alloy catalyst. In detail, it was a technique for preparing an alloy catalyst by calcining a mixed salt supported by passing two or more salts through a sequential melt impregnation process in order to easily support alloy particles or multisystem metal particles on a support. Accordingly, in Conventional Art 2, a desired catalyst may be prepared while adding various desired metal salts through continuous impregnation after mass-producing a catalyst initially impregnated with a metal salt by impregnating two or more metal salts several times. In addition, Conventional Art 2 is characterized in that two or more various alloy nanoparticles can be easily supported on a porous metal oxide support by using a sequential melt impregnation method, and oxide forms therefor can also be easily prepared. In addition, Conventional Art 2 is characterized in that when the calcinating conditions for the salt-supported support are variously varied by flowing air, nitrogen, and hydrogen gas, the oxidation state of particles obtained can be controlled so that the particles can be applied not only to alloys but also to composite metal oxide catalysts.

However, in the Conventional Arts 1 and 2, the particle size of the metal oxide in the platinum catalyst after heat treatment is small, and the content thereof is also not appropriate to result in an aggregation phenomenon between particles so that the particles not only have had a decreased coating effect, but also have had problems of poor durability and performance as an alloy catalyst having a core-shell structure.

PRIOR ART DOCUMENTS

Patent Documents (Patent Document 1) Korean Registered Patent Publication No. 10-1492102 (Publication date 2015 Feb. 10.)
(Patent Document 2) Korean Registered Patent Publication No. 10-1294100 (Publication date 2013 Aug. 7.)
(Patent Document 3) Korean Patent Publication No. 10-2022-0033545 (Publication date 2022. Mar. 17)
(Patent Document 4) Korean Patent Publication No. 10-2022-0033546 (Publication date 2022. Mar. 17)
(Patent Document 5) Korean Patent Publication No. 10-2022-0033547 (Publication date 2022. Mar. 17)
(Patent Document 6) Korean Patent Publication No. 10-2022-0033548 (Publication date 2022. Mar. 17)
(Patent Document 7) Korean Patent Publication No. 10-2022-0033549 (Publication date 2022. Mar. 17)

SUMMARY

The present disclosure was created to solve the above problems, and an object of the present disclosure is to provide a method for preparing a platinum alloy catalyst using an oxide coating, the method which increases the content and particle size of the transition metal in the alloy catalyst particles and can prevent an aggregation phenomenon between catalysts so that it not only can increase the coating effect, but also can prepare an alloy catalyst having a high performance and high durability core-shell structure.

A method for preparing a platinum alloy catalyst using an oxide coating according to an embodiment of the present disclosure includes: a first step of preparing a dispersion by mixing a commercial platinum catalyst and a transition metal precursor with a solvent; a second step of preparing a catalyst by putting an ultrasonic tip into the dispersion prepared through the first step and performing an ultrasonic process; a third step of performing a primary heat treatment process on the catalyst prepared through the second step; a fourth step of performing an acid treatment process on the catalyst that has undergone the primary heat treatment process through the third step; and a fifth step of preparing a platinum alloy catalyst by performing a secondary heat treatment process on the catalyst that has undergone the acid treatment process through the fourth step.

In the method for preparing a platinum alloy catalyst using an oxide coating according to an embodiment of the present disclosure, in the first step, the dispersion may be prepared by mixing 10 to 60 parts by weight of the commercial platinum catalyst and 2.5 to 15 parts by weight of the transition metal precursor with the solvent.

In the method for preparing a platinum alloy catalyst using an oxide coating according to an embodiment of the present disclosure, in the second step, the ultrasonic tip may be put into the dispersion prepared through the first step, the ultrasonic process may be performed at a temperature of 140 to 160° C. for 3 to 5 hours in a nitrogen gas atmosphere, and a post-treatment process may be performed after completing the ultrasonic process.

In the method for preparing a platinum alloy catalyst using an oxide coating according to an embodiment of the present disclosure, the post-treatment process in the second step may prepare a catalyst by sequentially stirring the ultrasonic process-completed dispersion with ethanol and distilled water, respectively, washing the stirred solution using a filter, and then vacuum-drying the washed solution at a temperature of 50 to 70° C. for 20 to 28 hours using a vacuum drying device.

In the method for preparing a platinum alloy catalyst using an oxide coating according to an embodiment of the present disclosure, in the third step, the catalyst prepared through the second step may be subdivided into a boat made of aluminum to perform the primary heat treatment process at a temperature of 400 to 800° C. for 1 to 2 hours under reducing gas atmosphere conditions.

In the method for preparing a platinum alloy catalyst using an oxide coating according to an embodiment of the present disclosure, in the fourth step, the catalyst that has undergone the primary heat treatment process through the third step may be mixed with perchloric acid and ethanol (EtOH) and stirred, the stirred solution may be subjected to an acid treatment process at a temperature of 75 to 95° C. for 1 to 2 hours using a heating mantle, the acid treatment process-completed catalyst may be sequentially stirred with ethanol and distilled water, respectively, the stirred solution may be subjected to a washing process using a filter, and then the washed solution may be vacuum-dried at a temperature of 50 to 70° C. for 20 to 28 hours using a vacuum drying device to proceed with the post-treatment process, and the acid treatment process and the post-treatment process may be repeatedly performed twice.

In the method for preparing a platinum alloy catalyst using an oxide coating according to an embodiment of the present disclosure, in the fifth step, the catalyst that has undergone the acid treatment process through the fourth step may be put in a boat made of aluminum to perform the primary heat treatment process at a temperature of 400 to 800° C. for 2 to 3 hours under reducing gas atmosphere conditions.

In the method for preparing a platinum alloy catalyst using an oxide coating according to an embodiment of the present disclosure, the transition metal of the first step may be any one of Ti, V, Cr, Mn, Fe, Co, Ni, Cu, Zn, Y, Zr, Mo, and Ru.

In the method for preparing a platinum alloy catalyst using an oxide coating according to an embodiment of the present disclosure, the transition metal of the first step may be any one of Ti, V, Cr, Mn, Fe, Co, Ni, Cu, Zn, and Ru.

In the method for preparing a platinum alloy catalyst using an oxide coating according to an embodiment of the present disclosure, the transition metal of the first step may be any one of Fe, Co, Mn, and Ni.

A platinum alloy catalyst using an oxide coating according to another embodiment of the present disclosure is prepared by the method for preparing a platinum alloy catalyst using an oxide coating.

Since the transition metal content in the alloy catalyst particles is increased by the primary heat treatment after the ultrasonic process, and then the acid treatment and the secondary heat treatment process are sequentially performed to enable the particle size to be increased and enable an aggregation phenomenon between catalysts to be prevented, the present disclosure can prepare an alloy catalyst which not only can increase the coating effect, but also has a high performance and high durability core-shell structure.

DETAILED DESCRIPTION OF THE PREFERRED EMBODIMENT

Figure 1:
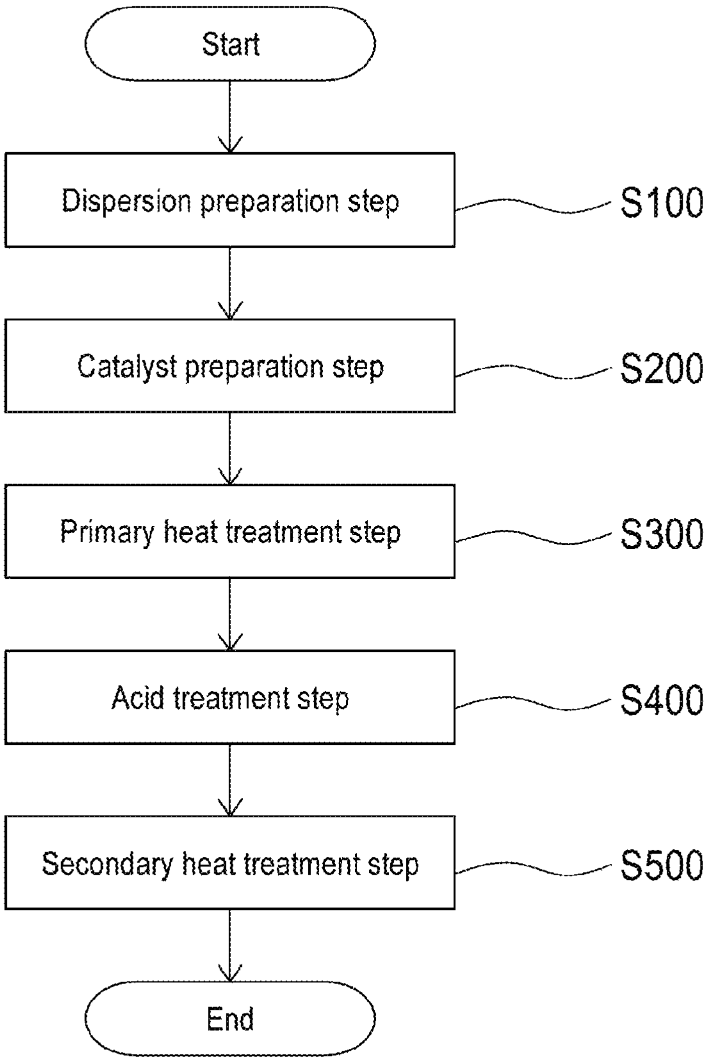
FIG. 1 is a flowchart illustrating a method for preparing a platinum alloy catalyst using an oxide coating according to an embodiment of the present disclosure.

Hereinafter, if it is determined that a detailed description of a related known technology may unnecessarily obscure the subject matter of the present disclosure, the detailed description will be omitted. In addition, the numbers used in the description process of this specification are only identifiers for distinguishing one component from another component.

Further, the terms used in this specification and claims should not be construed as limited in a dictionary sense, and based on the principle that the inventor can properly define the concept of terms in order to best explain his/her invention, it should be interpreted as meaning and concept consistent with the technical spirit of the present disclosure.

Therefore, since the embodiments described in this specification and the configurations shown in the drawings are only preferred embodiments of the present disclosure and do not represent all of the technical spirit of the present disclosure, it should be understood that various equivalents and variations that can replace them at the time of this application may exist.

A preferred embodiment of the present disclosure will be described in more detail, but technical parts that have already been well-known will be omitted or condensed for conciseness of description.

A method for preparing a platinum alloy catalyst using an oxide coating according to an embodiment of the present disclosure includes: a first step of preparing a dispersion by mixing a commercial platinum catalyst and a transition metal precursor with a solvent; a second step of preparing a catalyst by putting an ultrasonic tip into the dispersion prepared through the first step and performing an ultrasonic process; a third step of performing a primary heat treatment process on the catalyst prepared through the second step; a fourth step of performing an acid treatment process on the catalyst that has undergone the primary heat treatment process through the third step; and a fifth step of preparing a platinum alloy catalyst by performing a secondary heat treatment process on the catalyst that has undergone the acid treatment process through the fourth step.

Hereinafter, the method for preparing a platinum alloy catalyst using an oxide coating according to an embodiment of the present disclosure will be described in detail with reference to FIG. 1.

1. Dispersion Preparation Step (First Step, S100)

In this step, a process of preparing a dispersion by mixing a commercial platinum catalyst and a transition metal precursor with a solvent is performed.

Here, in this step, a dispersion may be prepared by mixing 10 to 60 parts by weight of the commercial platinum catalyst and 2.5 to 15 parts by weight of the transition metal precursor with a solvent.

Further, ethylene glycol may be used as a solvent in this step, and the commercial platinum catalyst and the transition metal precursor may be preferably composed at a molar ratio of 1:1.

Further, the transition metal is a metal that may be alloyed, and may be any one of Ti (titanium), V (vanadium), Cr (chromium), Mn (manganese), Fe (iron), Co (cobalt), Ni (nickel), Cu (copper), Zn (zinc), Y (yttrium), Zr (zirconium), Mo (molybdenum), and Ru (ruthenium), preferably any one of Ti, V, Cr, Mn, Fe, Co, Ni, Cu, Zn, and Ru that enable oxide coating with ultrasonic waves, and more preferably any one of Fe, Co, Mn, and Ni.

As such, a process of preparing a mixed dispersion is performed in this step by physically stirring a commercial platinum catalyst and a transition metal precursor using ethylene glycol as a solvent.

2. Catalyst Preparation Step (Second Step, S200)

A process of preparing a catalyst by putting an ultrasonic tip into the dispersion prepared through the first step (S100) and performing an ultrasonic process is performed in this step.

Specifically, in this step, the ultrasonic tip may be put into the dispersion prepared through the first step (S100), the ultrasonic process may be performed at a temperature of 140 to 160° C. for 3 to 5 hours in a nitrogen gas atmosphere, and a post-treatment process may be performed after completing the ultrasonic process.

Here, the post-treatment process of this step may include a process of sequentially stirring the ultrasonic process-completed dispersion with ethanol and distilled water, respectively, washing the stirred solution using a filter, and then vacuum-drying the washed solution at a temperature of 50 to 70° C. for 20 to 28 hours using a vacuum drying device, thereby preparing a catalyst. In addition, in the post-treatment process of this step, a process of stirring the ultrasonic process-completed dispersion with 300 ml of ethanol is preferably repeatedly performed twice, and then a process of stirring the dispersion with 600 ml of distilled water is preferably repeatedly performed twice.

Further, in this step, ethanol, distilled water, and the stirring process-completed dispersion are subjected to a washing process using a filter having 1 μm pores, the washed solution is vacuum-dried at a temperature of 50 to 70° C. for 20 to 28 hours using a vacuum drying device to prepare a catalyst, and the prepared catalyst may be put and stored in a vial.

3. Primary Heat Treatment Step (Third Step, S300)

In this step, a process of performing a primary heat treatment process on the catalyst prepared through the second step (S200) is performed.

Specifically, this step may include a process of subdividing the catalyst prepared through the second step (S200) into a boat made of aluminum to perform a primary heat treatment process at a temperature of 400 to 800° C. for 1 to 2 hours under reducing gas atmosphere (5% $H_2$ and 95% $N_2$) conditions.

Here, in this step, the catalyst prepared through the second step (S200) may be subdivided into boats made of aluminum by 1 g to proceed with the primary heat treatment process, and it is preferable that the temperature raising condition during the primary heat treatment process is set to 5° C./min. The primary heat treatment process-completed catalyst may be put and stored in a vial.

4. Acid Treatment Step (Fourth Step, S400)

In this step, a process of performing an acid treatment process on the catalyst that has undergone the primary heat treatment process through the third step (S300) is performed. Specifically, in this step, the catalyst that has undergone the primary heat treatment process through the third step (S300) may be mixed and stirred with perchloric acid and ethanol (EtOH), and an acid treatment process may be performed on the stirred solution at a temperature of 70 to 95° C. for 1 to 2 hours using a heating mantle.

Further, in this step, the acid treatment process-completed catalyst may be sequentially stirred with ethanol and distilled water, respectively, a washing process may be performed on the mixed solution using a filter, and then the washed solution may be vacuum-dried at a temperature of 50 to for 20 to 28 hours using a vacuum drying device to perform a post-treatment process.

Here, it is preferable to repeatedly perform twice a process of stirring the acid treatment process-completed catalyst with 300 ml of ethanol, and thereafter, it is preferable to repeatedly perform twice a process of stirring the dispersion with 600 ml of distilled water.

Further, in this step, the catalyst that has completed the stirring process with ethanol and distilled water may be subjected to a washing process using a filter having 1 μm pores, and the washed catalyst may be vacuum-dried at a temperature of for 24 hours using a vacuum drying device.

As such, the acid treatment process and the post-treatment process may be repeatedly performed twice in this step.

5. Secondary Heat Treatment Step (Fifth Step, S500)

In this step, a process of preparing a platinum alloy catalyst is performed by performing a secondary heat treatment process on the catalyst that has undergone the acid treatment process through the fourth step (S400).

Specifically, in this step, the catalyst that has undergone the acid treatment process through the fourth step (S400) may be put in a boat made of aluminum to perform a secondary heat treatment process at a temperature of 400° C. for 2 to 3 hours under reducing gas atmosphere (5% $H_2$ and 95% $N_2$) conditions.

Here, in this step, a certain amount of the catalyst prepared through the fourth step (S400) may be subdivided into a boat made of aluminum to proceed with the secondary heat treatment process, and the temperature raising condition during the secondary heat treatment process is preferably set to 5° C./min. The platinum alloy catalyst prepared by completing the secondary heat treatment process may be put and stored in a vial.

Example 1

A mixed dispersion was prepared by stirring 5 g (9.66 mmole) of a commercial platinum catalyst (TEC10V40E) and 3.42 g (9.66 mmole) of a Fe precursor ($Fe(acac)_3$) among transition metals with 200 ml of ethylene glycol as a solvent. After putting an ultrasonic tip into such a prepared dispersion, performing an ultrasonic process at a temperature of 160° C. for 4 hours in a nitrogen gas atmosphere, and then repeatedly stirring twice the dispersion with 300 ml of ethanol, the dispersion was repeatedly stirred twice with 600 ml of distilled water. Thereafter, after washing the stirred solution using a filter, a catalyst was prepared by vacuum-drying the washed solution at a temperature of 60° C. for 24 hours using a vacuum drying device. In addition, the catalyst was subdivided into each of boats made of aluminum by 1 g to perform a primary heat treatment process at a temperature of 400° C. for 2 hours in a reducing gas atmosphere (5% $H_2$ and 95% $N_2$).

Thereafter, the catalyst was mixed with perchloric acid and ethanol (EtOH) and stirred, the stirred solution was subjected to an acid treatment process at a temperature of 85° C. for 2 hours using a heating mantle, the catalyst was repeatedly stirred twice with 300 ml of ethanol, and then the catalyst was repeatedly stirred twice with 600 ml of distilled water. Thereafter, after washing the stirred solution using a filter, the washed solution was vacuum-dried at a temperature of 60° C. for 24 hours using a vacuum drying device. In addition, a platinum alloy catalyst was prepared by putting the dried catalyst in a boat made of aluminum and performing a primary heat treatment process at a temperature of 400° C. for 2 hours in a nitrogen gas atmosphere.

Example 2

A mixed dispersion was prepared by stirring 5 g (9.66 mmole) of a commercial platinum catalyst (TEC10V40E) and 3.42 g (9.66 mmole) of a Fe precursor ($Fe(acac)_3$) among transition metals with 200 ml of ethylene glycol as a solvent. After putting an ultrasonic tip into such a prepared dispersion, performing an ultrasonic process at a temperature of 160° C. for 4 hours in a nitrogen gas atmosphere, and then repeatedly stirring twice the dispersion with 300 ml of ethanol, the dispersion was repeatedly stirred twice with 600 ml of distilled water. Thereafter, after washing the stirred solution using a filter, a catalyst was prepared by vacuum-drying the washed solution at a temperature of 60° C. for 24 hours using a vacuum drying device. In addition, the catalyst was subdivided into each of boats made of aluminum by 1 g to perform a primary heat treatment process at a temperature of 600° C. for 2 hours in a reducing gas atmosphere (5% $H_2$ and 95% $N_2$).

Thereafter, the catalyst was mixed with perchloric acid and ethanol (EtOH) and stirred, the stirred solution was subjected to an acid treatment process at a temperature of 85° C. for 2 hours using a heating mantle, the catalyst was repeatedly stirred twice with 300 ml of ethanol, and then the catalyst was repeatedly stirred twice with 600 ml of distilled water. Thereafter, after washing the stirred solution using a filter, the washed solution was vacuum-dried at a temperature of 60° C. for 24 hours using a vacuum drying device. In addition, a platinum alloy catalyst was prepared by putting the dried catalyst in a boat made of aluminum and performing a primary heat treatment process at a temperature of 400° C. for 2 hours in a gas atmosphere containing nitrogen and hydrogen.

Example 3

A mixed dispersion was prepared by stirring 5 g (9.66 mmole) of a commercial platinum catalyst (TEC10V40E) and 3.42 g (9.66 mmole) of a Fe precursor ($Fe(acac)_3$) among transition metals with 200 ml of ethylene glycol as a solvent. After putting an ultrasonic tip into such a prepared dispersion, performing an ultrasonic process at a temperature of 160° C. for 4 hours in a nitrogen gas atmosphere, and then repeatedly stirring twice the dispersion with 300 ml of ethanol, the dispersion was repeatedly stirred twice with 600 ml of distilled water. Thereafter, after washing the stirred solution using a filter, a catalyst was prepared by vacuum-drying the washed solution at a temperature of 60° C. for 24 hours using a vacuum drying device. In addition, the catalyst was subdivided into each of boats made of aluminum by 1 g to perform a primary heat treatment process at a temperature of 800° C. for 2 hours in a reducing gas atmosphere (5% $H_2$ and 95% $N_2$).

Thereafter, the catalyst was mixed with perchloric acid and ethanol (EtOH) and stirred, the stirred solution was subjected to an acid treatment process at a temperature of 85° C. for 2 hours using a heating mantle, the catalyst was repeatedly stirred twice with 300 ml of ethanol, and then the catalyst was repeatedly stirred twice with 600 ml of distilled water. Thereafter, after washing the stirred solution using a filter, the washed solution was vacuum-dried at a temperature of 60° C. for 24 hours using a vacuum drying device. In addition, a platinum alloy catalyst was prepared by putting the dried catalyst in a boat made of aluminum and performing a primary heat treatment process at a temperature of 400° C. for 2 hours in a nitrogen gas atmosphere.

Example 4

A platinum alloy catalyst was prepared in the same manner as in Example 1 except that a Co precursor instead of the Fe precursor among transition metals was used.

Example 5

A platinum alloy catalyst was prepared in the same manner as in Example 1 except that a Mn precursor instead of the Fe precursor among transition metals was used.

Example 6

A platinum alloy catalyst was prepared in the same manner as in Example 1 except that a Ni precursor instead of the Fe precursor among transition metals was used.

<Comparative Example 1> Polyol Process

After 1 g (1.93 mmole) of a commercial platinum catalyst (TEC10V40E) and 0.683 g (1.93 mmole) of a Fe precursor ($Fe(acac)_3$) were physically stirred with 200 ml of ethylene glycol as a solvent, and an ultrasonic process was performed on the stirred dispersion at a temperature of 160° C. for 4 hours in a nitrogen gas atmosphere, the dispersion was repeatedly stirred twice with 300 ml of ethanol, and then the dispersion was repeatedly stirred twice with 600 ml of distilled water. Thereafter, after washing the stirred solution using a filter, a catalyst was prepared by vacuum-drying the washed solution at a temperature of 60° C. for 24 hours using a vacuum drying device. In addition, the catalyst was subdivided into a boat made of aluminum and subjected to a primary heat treatment process at temperatures of 400° C., 600° C., and 800° C., respectively, for 2 hours in a nitrogen gas atmosphere. Thereafter, the catalyst was mixed with perchloric acid and ethanol (EtOH) and stirred, the stirred solution was subjected to an acid treatment process at a temperature of 85° C. for 2 hours using a heating mantle, the catalyst was repeatedly stirred twice with 300 ml of ethanol, and then the catalyst was repeatedly stirred twice with 600 ml of distilled water. Thereafter, after washing the stirred solution using a filter, the washed solution was vacuum-dried at a temperature of 60° C. for 24 hours using a vacuum drying device. In addition, a platinum alloy catalyst was prepared by putting the dried catalyst in a boat made of aluminum and performing a primary heat treatment process at a temperature of 400° C. for 2 hours in a nitrogen gas atmosphere.

<Comparative Example 2> Impregnation Process 1 g (1.93 mmole) of a commercial platinum catalyst (TEC10V40E) and 0.323 g (1.93 mmole) of a Fe precursor ($FeCl_3$) were physically stirred with 10 mL of DI water as a solvent, and pulverization and mixing processes were performed on the stirred dispersion for 10 minutes using a mortar and pestle. In addition, the mixed dispersion was put in a petro dish and vacuum-dried at a temperature of 60° C. for 24 hours using a vacuum drying device to prepare a catalyst. In addition, the catalyst was subdivided into a boat made of aluminum and subjected to a primary heat treatment process at temperatures of 400° C., 600° C., and 800° C., respectively, for 2 hours in a reducing gas atmosphere (5% $H_2$ and 95% $N_2$). Thereafter, the catalyst was mixed with perchloric acid and ethanol (EtOH) and stirred, the stirred solution was subjected to an acid treatment process at a temperature of 85° C. for 2 hours using a heating mantle, the catalyst was repeatedly stirred twice with 300 ml of ethanol, and then the catalyst was repeatedly stirred twice with 600 ml of distilled water. Thereafter, after washing the stirred solution using a filter, the washed solution was vacuum-dried at a temperature of 60° C. for 24 hours using a vacuum drying device. In addition, a platinum alloy catalyst was prepared by putting the dried catalyst in a boat made of aluminum and performing a primary heat treatment process at a temperature of 400° C. for 2 hours in a reducing gas atmosphere (5% $H_2$ and 95% $N_2$).

<Experimental Example 1> XRD Analysis Results

Figure 2:
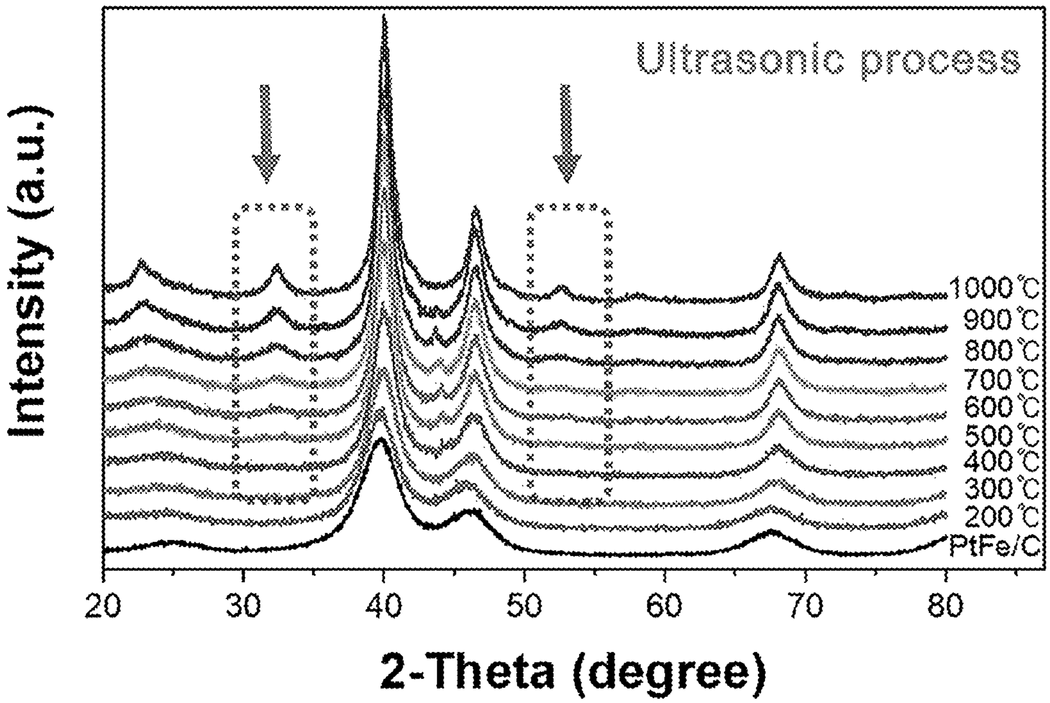
FIG. 2 shows XRD analysis results of the platinum alloy catalyst according to the heat treatment temperatures after the ultrasonic process of the present disclosure.
Figure 3:
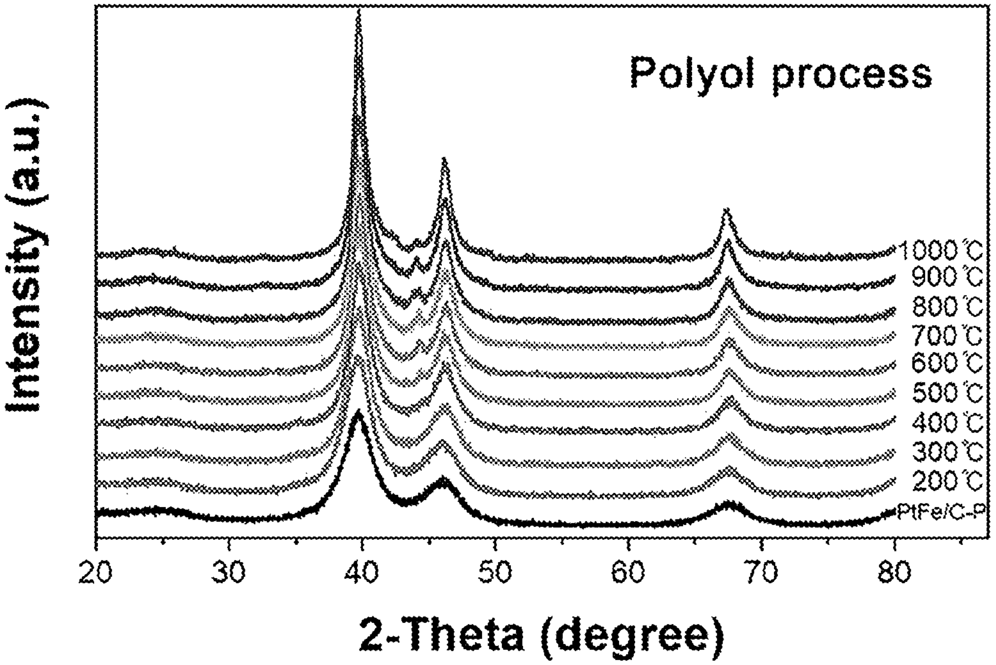
FIG. 3 shows XRD analysis results of the platinum alloy catalyst according to the heat treatment temperatures after the polyol process.
Figure 4:
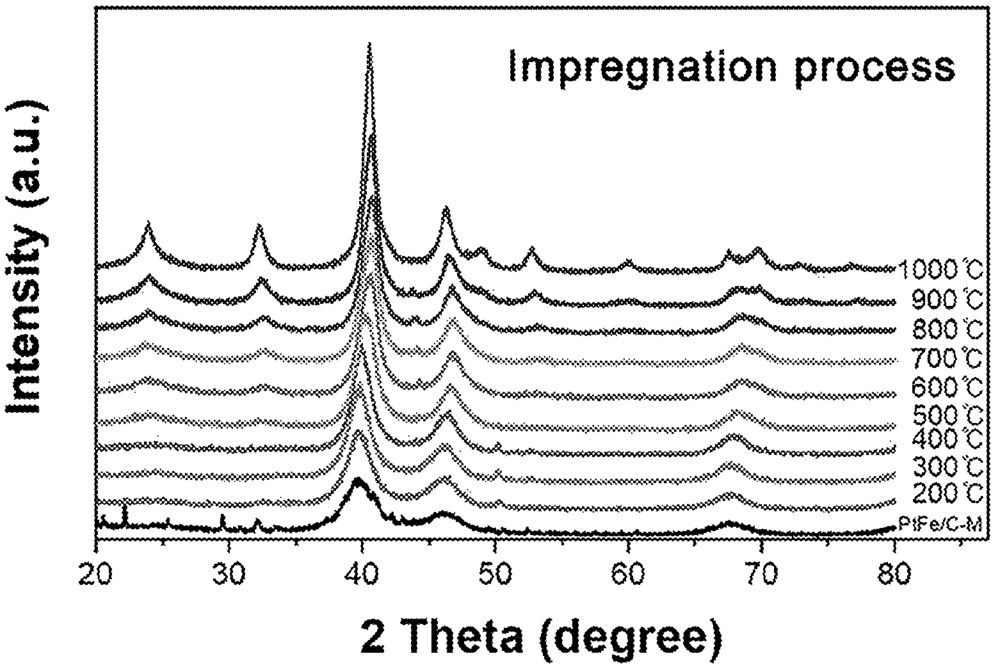
FIG. 4 shows XRD analysis results of the platinum alloy catalyst according to the heat treatment temperatures after the impregnation process.

FIG. 2 shows XRD analysis results of the platinum alloy catalyst according to the heat treatment temperatures after the ultrasonic process of the present disclosure, FIG. 3 shows XRD analysis results of the platinum alloy catalyst according to the heat treatment temperatures after the polyol process, and FIG. 4 shows XRD analysis results of the platinum alloy catalyst according to the heat treatment temperatures after the impregnation process.

In this experimental example, after the ultrasonic process, the polyol process, and the impregnation process, the heat treatment process was performed to compare the degrees of alloying according to temperatures, respectively.

After the ultrasonic process of the present disclosure, XRD values were respectively analyzed at temperatures of 200° C. to 1,000° C. in the primary heat treatment process, and the results are shown in FIG. 2. That is, as a result of the analysis, it could be found that intermetallic alloy peaks appeared at temperatures of 800° C. or higher in the heat treatment process.

Further, after the polyol process, XRD values were respectively analyzed at temperatures of 200° C. to 1,000° C. in the primary heat treatment process, and the results are shown in FIG. 3. That is, as a result of the analysis, it could be found that the intermetallic alloy peaks did not appear, indicating that the metals were not alloyed.

Further, after the impregnation process, XRD values were respectively analyzed at temperatures of 200° C. to 1,000° C. in the primary heat treatment process, and the results are shown in FIG. 4. That is, although intermetallic alloy peaks were found in the case of the impregnation method, it was confirmed that there was a disadvantage in that the uniformity was poor since many particles were agglomerated in the TEM results.

Figure 5:
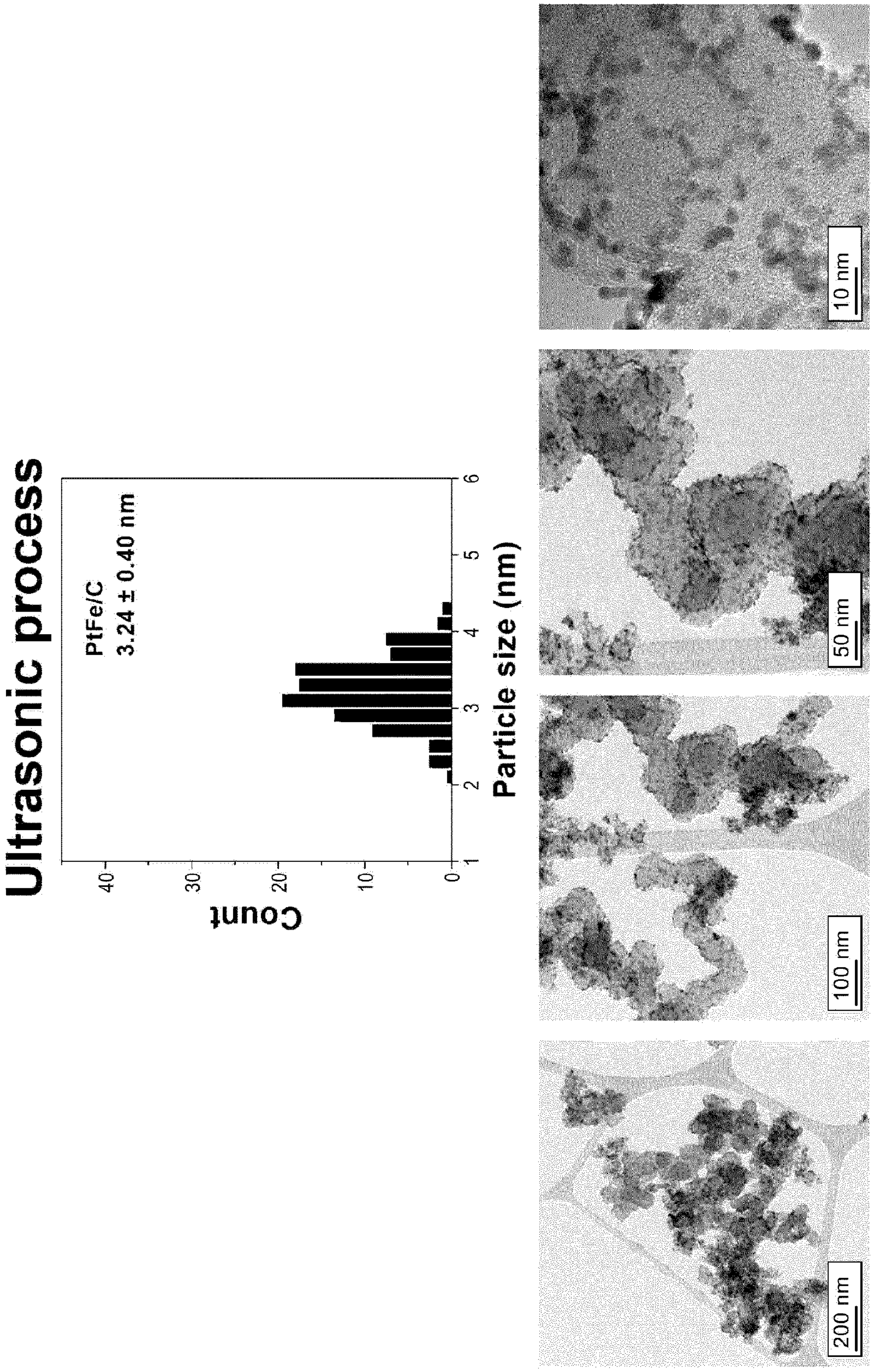
FIG. 5 shows particle size distribution of the platinum alloy catalyst according to the ultrasonic process of the present disclosure.
Figure 6:
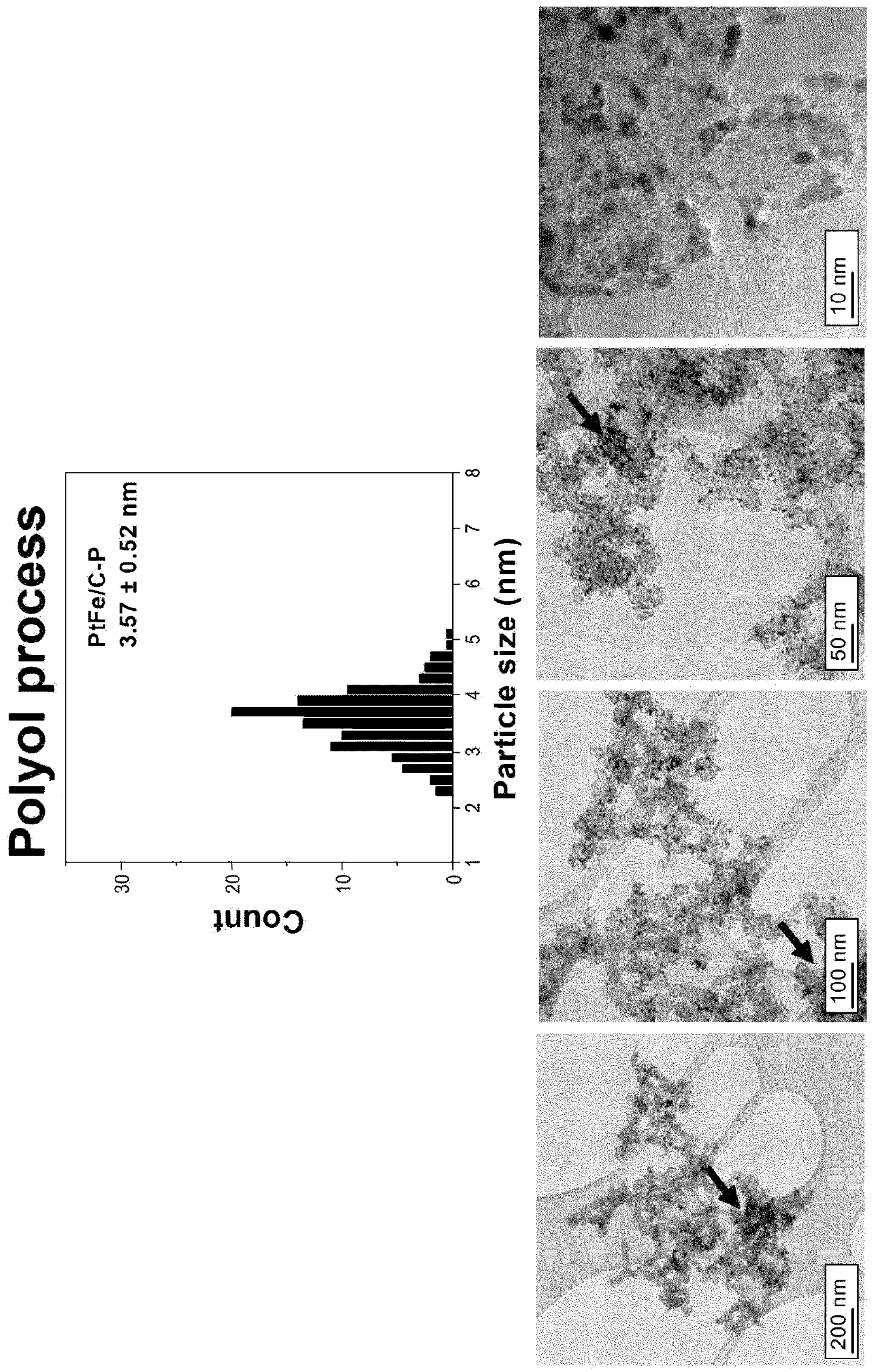
FIG. 6 shows particle size distribution of the platinum alloy catalyst according to the polyol process.
Figure 7:
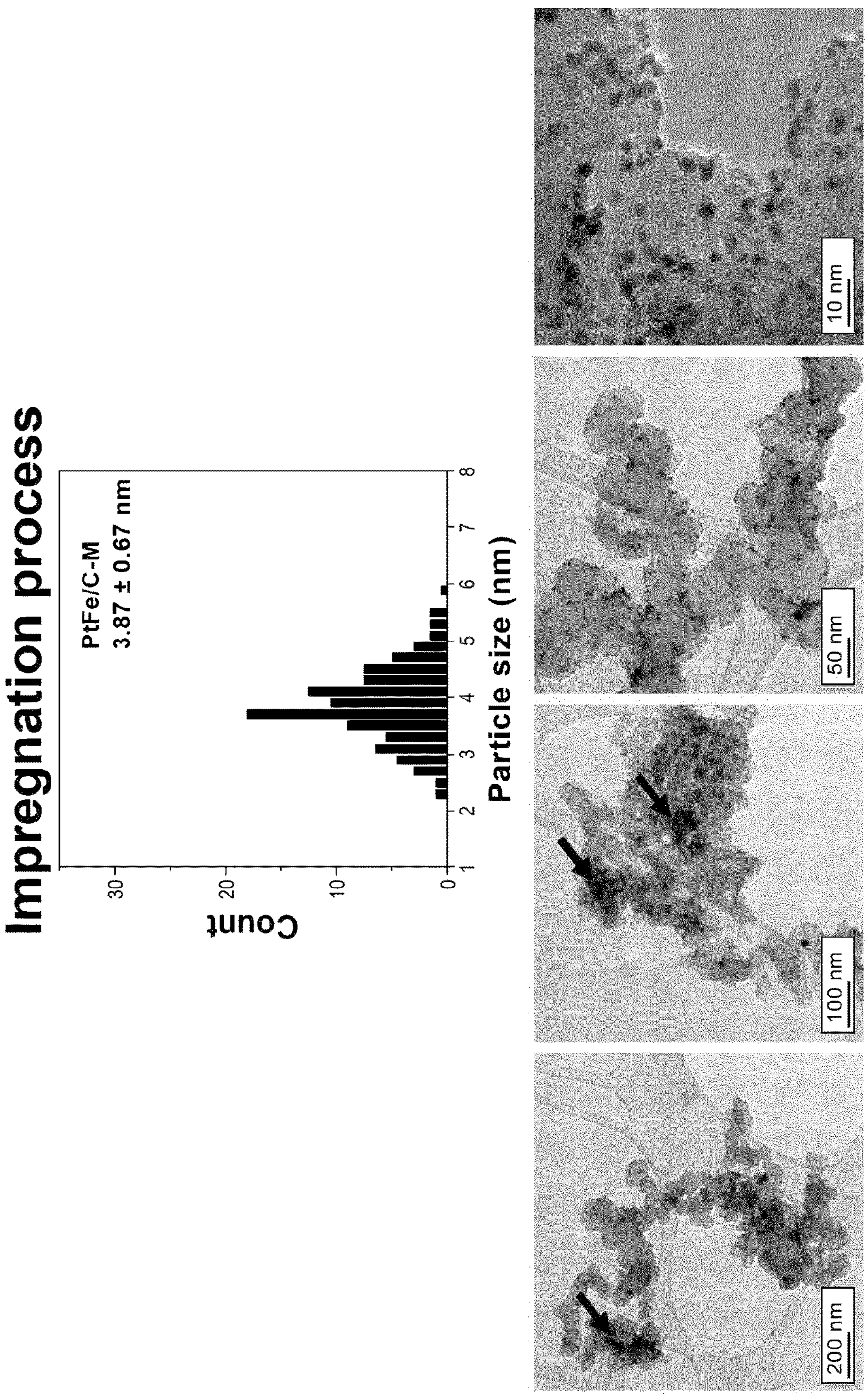
FIG. 7 shows particle size distribution of the platinum alloy catalyst according to the impregnation process.

<Experimental Example 2> Particle Analysis Results of Platinum Alloy Catalyst According to Processes FIG. 5 shows particle size distribution of the platinum alloy catalyst according to the ultrasonic process of the present disclosure, FIG. 6 shows particle size distribution of the platinum alloy catalyst according to the polyol process, and FIG. 7 shows particle size distribution of the platinum alloy catalyst according to the impregnation process.

The particle size distribution of the platinum alloy catalyst according to the ultrasonic process of the present disclosure was analyzed and shown in FIG. 5. That is, as a result of the analysis, in the cases of Examples 1 to 3 prepared through the ultrasonic process, it could be found that the transition metal was uniformly coated on the catalyst, and it could be found that the size of particles was also large to be nm.

The particle size distribution of the platinum alloy catalyst according to the polyol process was analyzed and shown in FIG. 6, and the particle size distribution of the platinum alloy catalyst according to the impregnation process was analyzed and shown in FIG. 7. That is, as a result of the analysis, in the case of Comparative Example 1 prepared through the polyol process and the case of Comparative Example 2 prepared through the impregnation process, it could be found that the transition metal was not uniformly distributed on the catalyst. In addition, it could be found that particle sizes were small, and agglomeration phenomena occurred in Comparative Example 1 and Comparative Example 2 compared to Examples 1 to 3 (In FIGS. 6 and 7, arrows indicate where the agglomeration phenomena occur).

Figure 8:
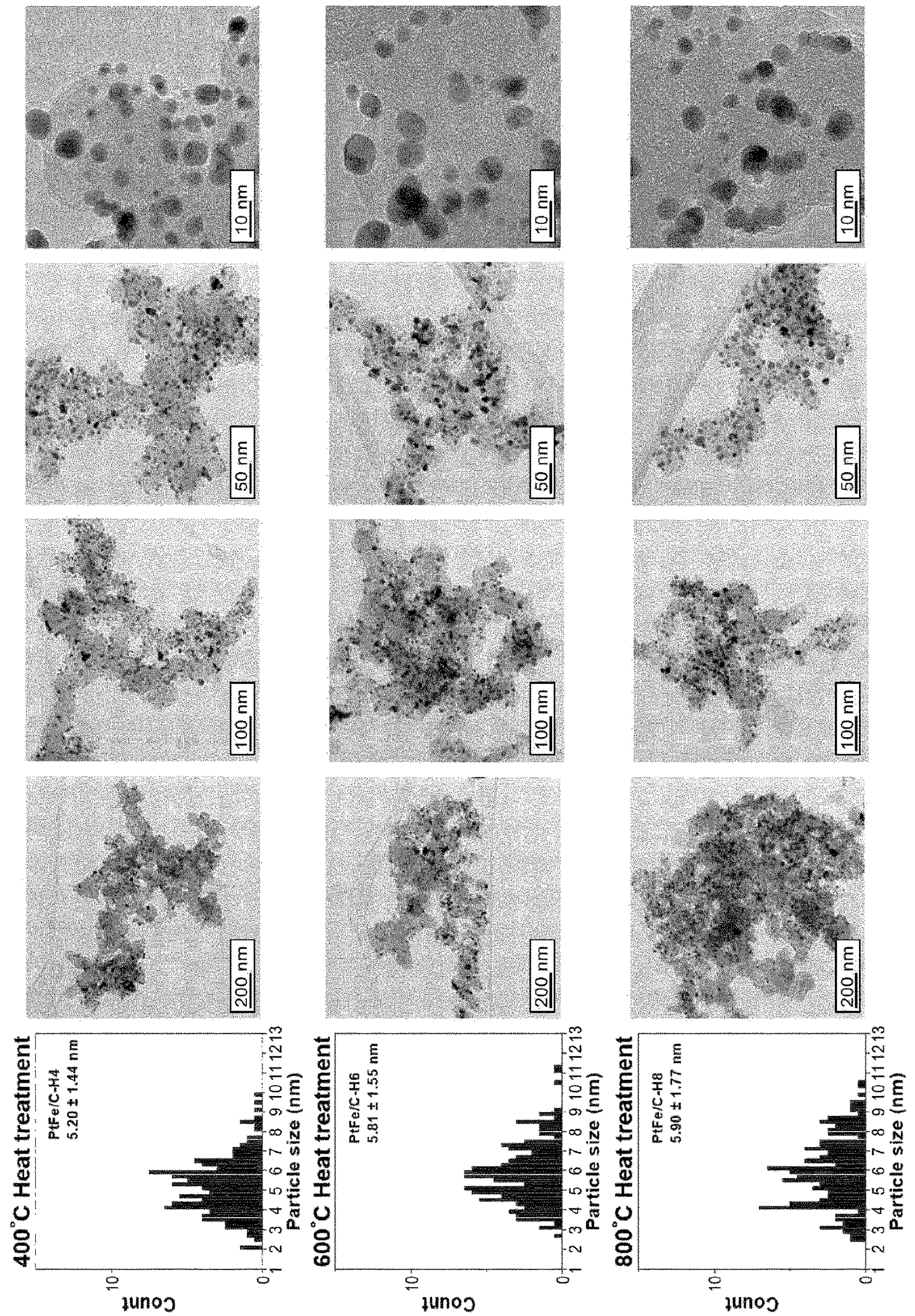
FIG. 8 shows particle size distributions of the platinum alloy catalyst according to the temperatures of the primary heat treatment process of the present disclosure.

<Experimental Example 3> Particle Analysis Results of Platinum Alloy Catalyst According to Heat Treatment Temperatures FIG. 8 shows particle size distributions of the platinum alloy catalyst according to the temperatures of the primary heat treatment process of the present disclosure.

In this experimental example, the particles of the platinum alloy catalyst according to the temperatures of the primary heat treatment process of the present disclosure were analyzed in various ways.

The primary heat treatment temperature in Example 1 of the present disclosure is 400° C., the primary heat treatment temperature in Example 2 thereof is 600° C., and the primary heat treatment temperature in Example 3 thereof is 800° C.

First, referring to FIG. 8, it could be found that the particle sizes of the platinum alloy catalyst increase more as the heat treatment temperatures increase, and agglomeration phenomena do not occur even when the heat treatment temperatures increase. Therefore, it could be found that it is most preferable to perform heat treatment at a temperature condition of 800° C. in the primary heat treatment process as in Example 3 of the present disclosure.

Figure 9:
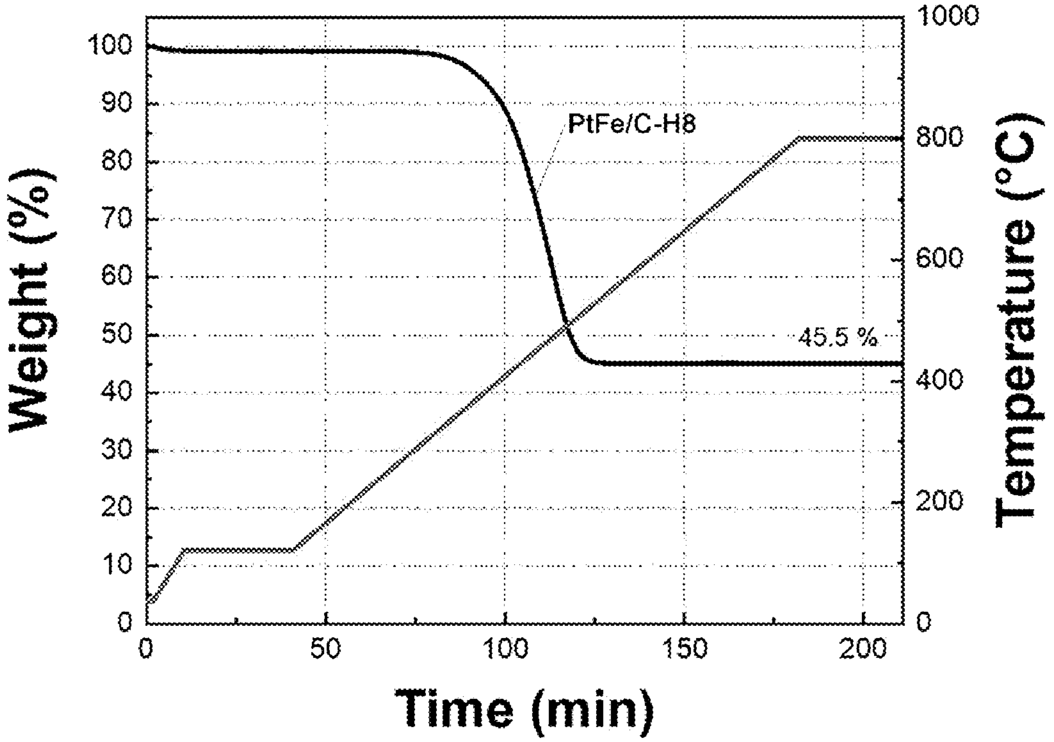
FIG. 9 shows results of TGA analysis for analyzing the metal content ratios of the platinum alloy catalyst according to the present disclosure.
Figure 10:
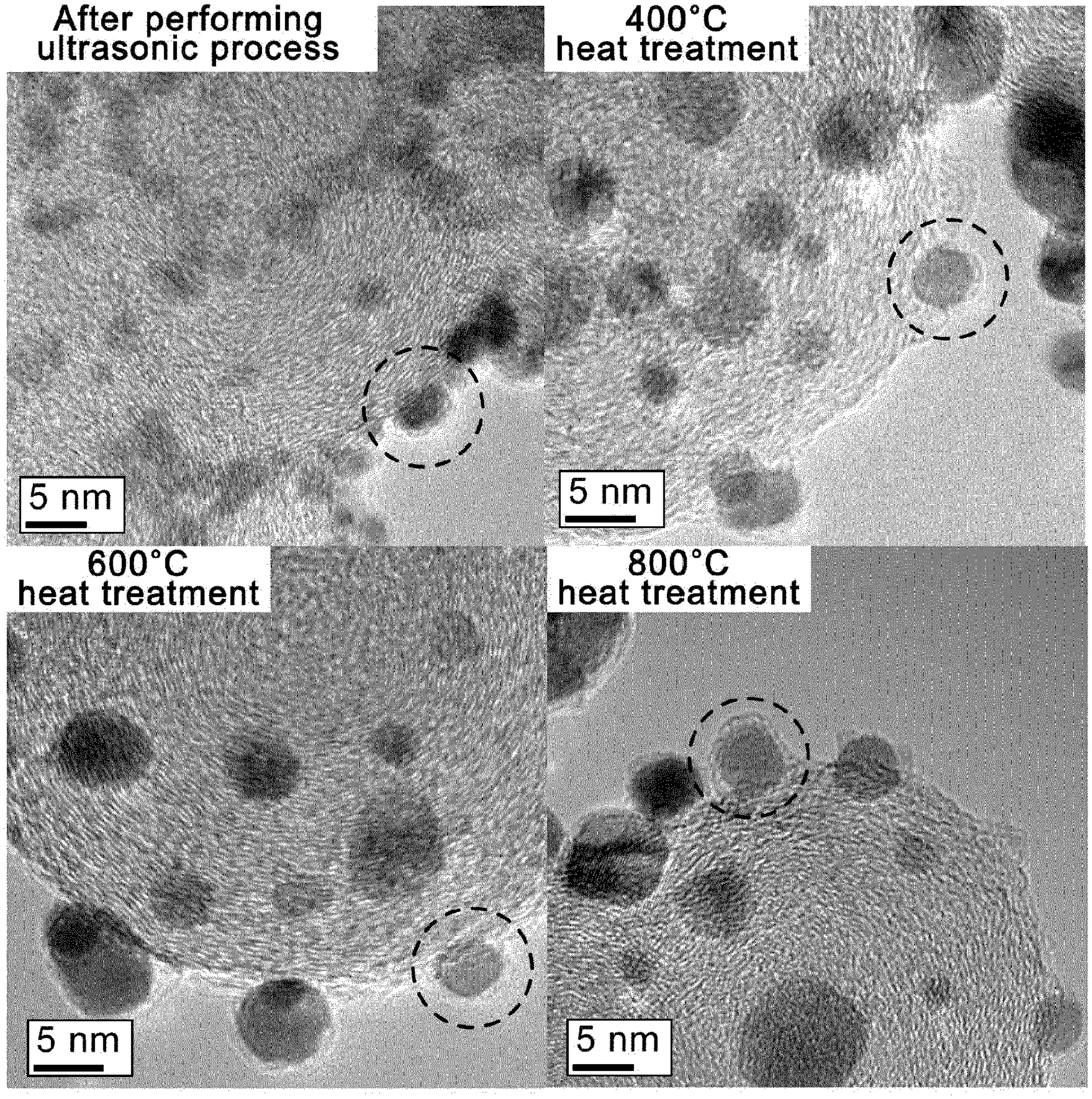
FIGS. 10 to 12 show STEM photographing results of the platinum alloy catalyst according to the temperatures of the primary heat treatment process of the present disclosure.
Figure 11:
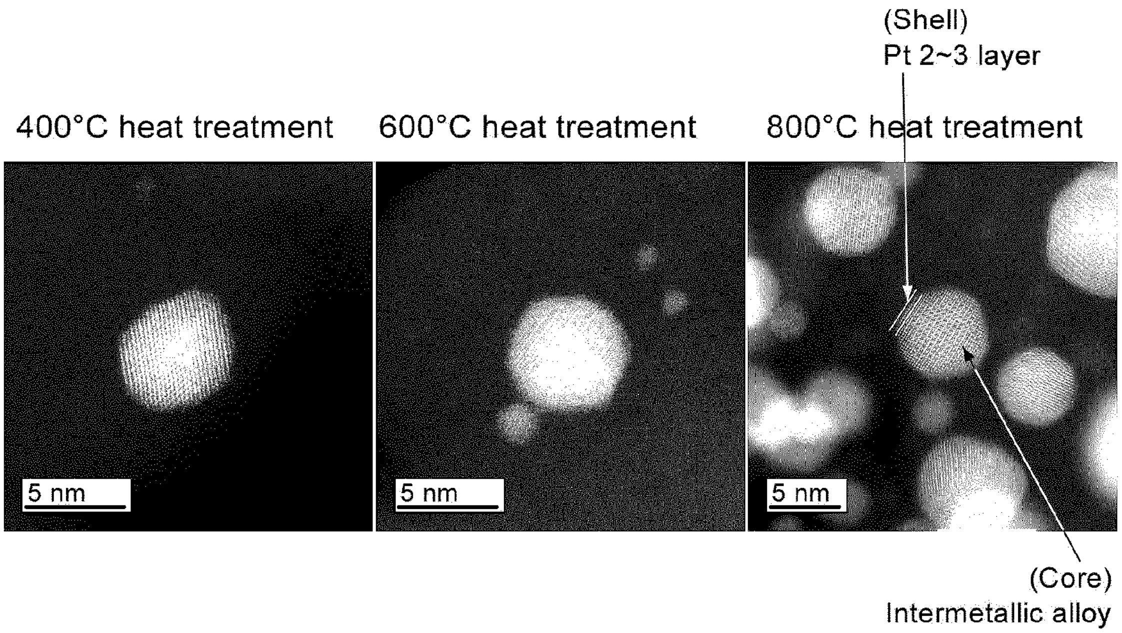
Figure 12:
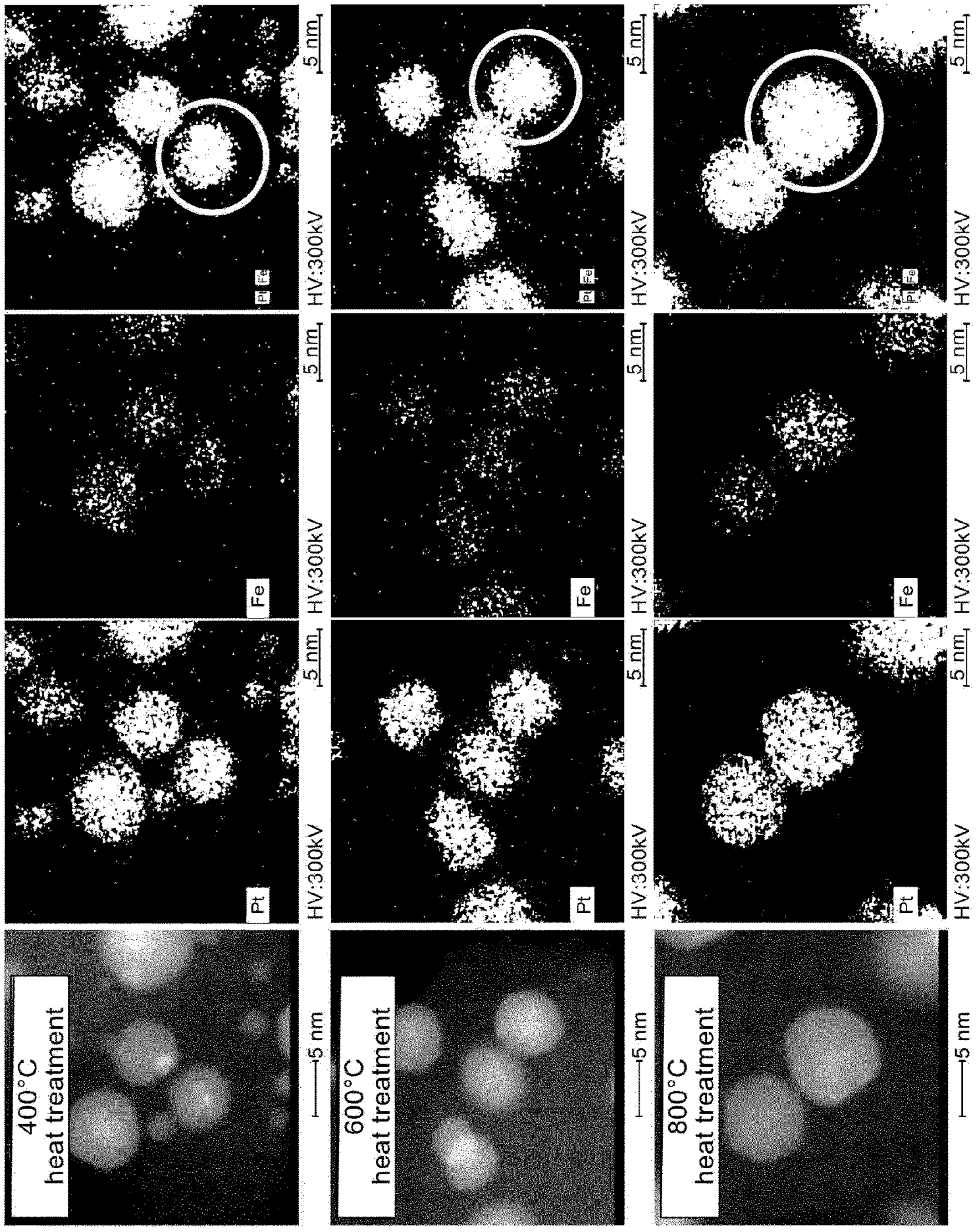

FIG. 9 shows results of TGA analysis for analyzing the metal content ratios of the platinum alloy catalyst according to the present disclosure, and FIGS. 10 to 12 show STEM photographing results of the platinum alloy catalyst according to the temperatures of the primary heat treatment process of the present disclosure.

Further, in this experimental example, the metal content ratios in the platinum alloy catalyst were analyzed, and ICP and TGA analyses were performed for cross-confirmation. The ICP analysis results are shown in Table 1 below, and the TGA analysis results are shown in FIG. 9.

TABLE 1

| ICP | Metal content (wt %, ICP) | | | Atomic percentage (at %) | | Pt/Fe content |
|---|---|---|---|---|---|---|
| ICP | Pt | Fe | Total | Pt | Fe | ratio |
| 400° C. heat treatment | 37.1 | 2.1 | 39.2 | 83.5 | 16.5 | 5.2 |
| 600° C. heat treatment | 42.0 | 2.5 | 44.5 | 82.8 | 17.2 | 4.8 |
| 800° C. heat treatment | 40.3 | 3.6 | 43.9 | 76.2 | 23.8 | 3.3 |

Referring to Table 1, as results of the ICP analysis, it could be found that alloying of iron in the platinum alloy catalyst proceeds better since the platinum/iron (Pt/Fe) content ratios decrease as the temperature conditions increase in the primary heat treatment process. That is, alloying of iron in the platinum alloy catalyst proceeds the best in Example 3.

Referring to FIG. 9, as a result of TGA analysis, in the case of the heat treatment sample in Example 3 in which the temperature was 800° C. in the primary heat treatment process, it could be found that the metal content was shown to be 45.5%, which was similar to the total metal content of 43.9% shown in the ICP analysis result. Therefore, it could be confirmed that the contents and particle sizes of iron in the platinum alloy catalyst increased as the temperature conditions increased in the primary heat treatment process of the present disclosure, and it could be inferred that the uniformity of particle size distribution increased, and the atomic ordering increased. In addition, referring to FIG. 10, amorphous iron oxides formed around the platinum particles could be confirmed through the ultrasonic process, and since the iron oxides are maintained on the particle surface even after high-temperature heat treatment, it could also be confirmed that it is possible to partially suppress particle growth in the process of performing alloying.

Meanwhile, referring to FIGS. 11 and 12, it could be found that as the temperature conditions increased in the primary heat treatment process of the present disclosure, alloying progressed better and atomic ordering increased. In addition, it could be found that all platinum alloy catalysts had a core-shell structure in Examples 1 to 3 regardless of the temperatures in the primary heat treatment process. In particular, it could be found that Example 3 in which the temperature condition in the primary heat treatment process was 800° C. had the core-shell structure better formed while having the most suitable particle size distribution.

<Experimental Example 4> Electrochemical Analysis Results

Figure 13:
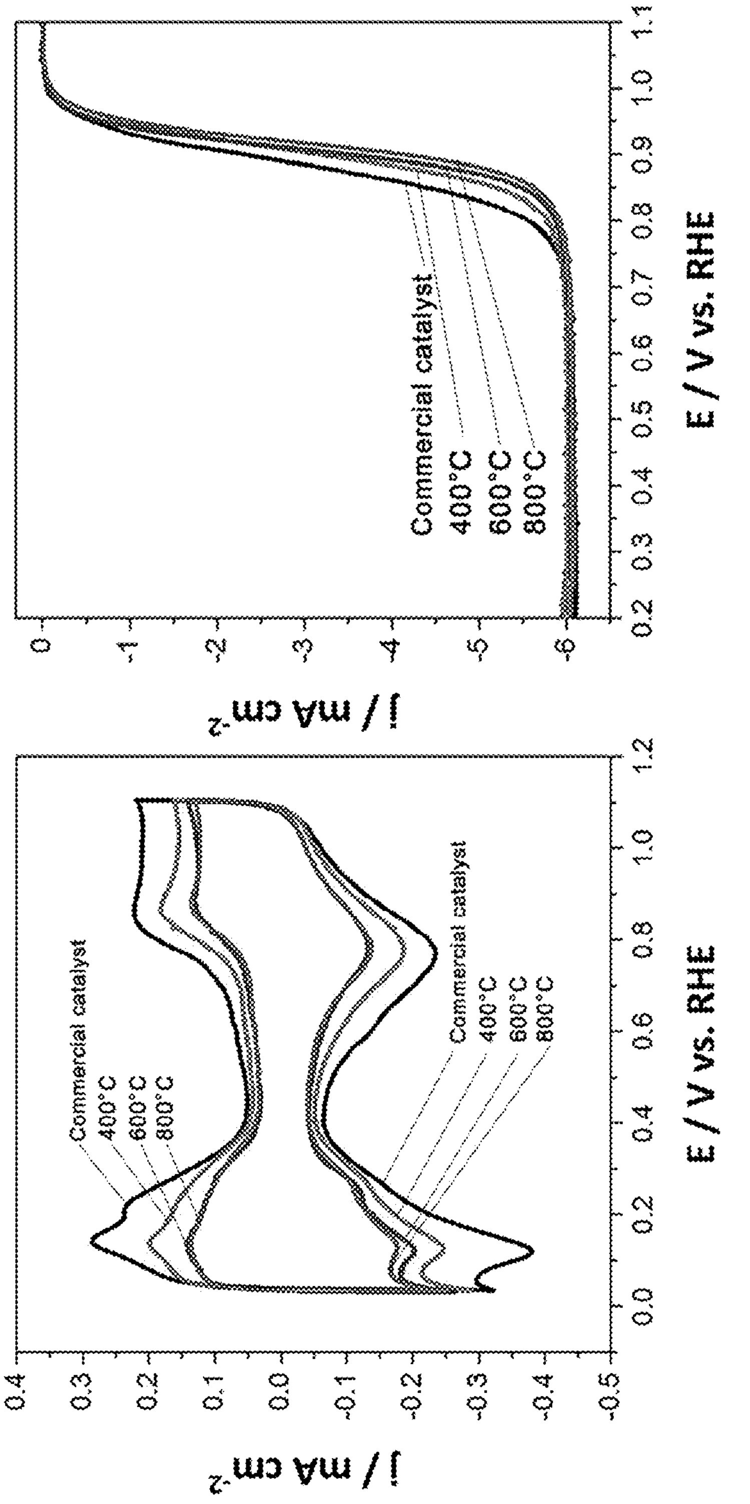
FIG. 13 is graphs showing activity evaluation results of the platinum alloy catalyst according to the temperatures of the primary heat treatment process of the present disclosure.

FIG. 13 is graphs showing activity evaluation results of the platinum alloy catalyst according to the temperatures of the primary heat treatment process of the present disclosure.

In this experimental example, the activities of the platinum alloy catalyst, which vary with temperatures in the primary heat treatment process of the present disclosure, were evaluated and shown in graphs in FIG. 13, and the result values are shown in Table 2 below.

TABLE 2

| | ECSA ($m^2/g$) | MA ($A/mg_{pt}$) | SA ($uA/cm^2$) | $E_{1/2}$ (mV) | Metal content (wt%, ICP) | Crystallite size (XRD, 111), nm) | Particle size (TEM, nm) |
|---|---|---|---|---|---|---|---|
| Commercial catalyst | 54.23 | 0.182 | 335.33 | 884 | 37.7, 0 | 1.89 | 3.08 ± 0.44 |
| 400° C. heat treatment | 40.69 | 0.324 | 795.83 | 902 | 37.1, 2.1 | 5.05 | 5.20 ± 1.44 |
| 600° C. heat treatment | 30.57 | 0.396 | 1294.0 | 907 | 42.0, 2.5 | 5.97 | 5.81 ± 1.55 |
| 800° C. heat treatment | 29.56 | 0.618 | 2089.4 | 915 | 40.3, 3.6 | 6.22 | 5.90 ± 1.77 |

<ECSA: Electrochemical surface area, MA: Mass activity, SA: Specific activity>

Referring to Table 2 above and FIG. 13, it could be found that the ECSA of the catalyst decreases since the size of the particles increases as the temperature rises from 400° C. to 800° C. in the primary heat treatment process of the present disclosure. In addition, in Example 2 in which the temperature was 600° C. in the primary heat treatment process, it could be found that the growth of the alloy particle size was suppressed due to the amorphous iron oxides present on the surface so that the ECSA was maintained similarly. In addition, it could be found that the mass activity of the catalyst (catalytic ability) increased since the content and atomic ordering of iron (Fe) increased as the temperature increased in the primary heat treatment process of the present disclosure. Therefore, it could be confirmed that Example 3 in which the temperature in the primary heat treatment process of the present disclosure was 800° C. had the most suitable temperature condition.

Figure 14:
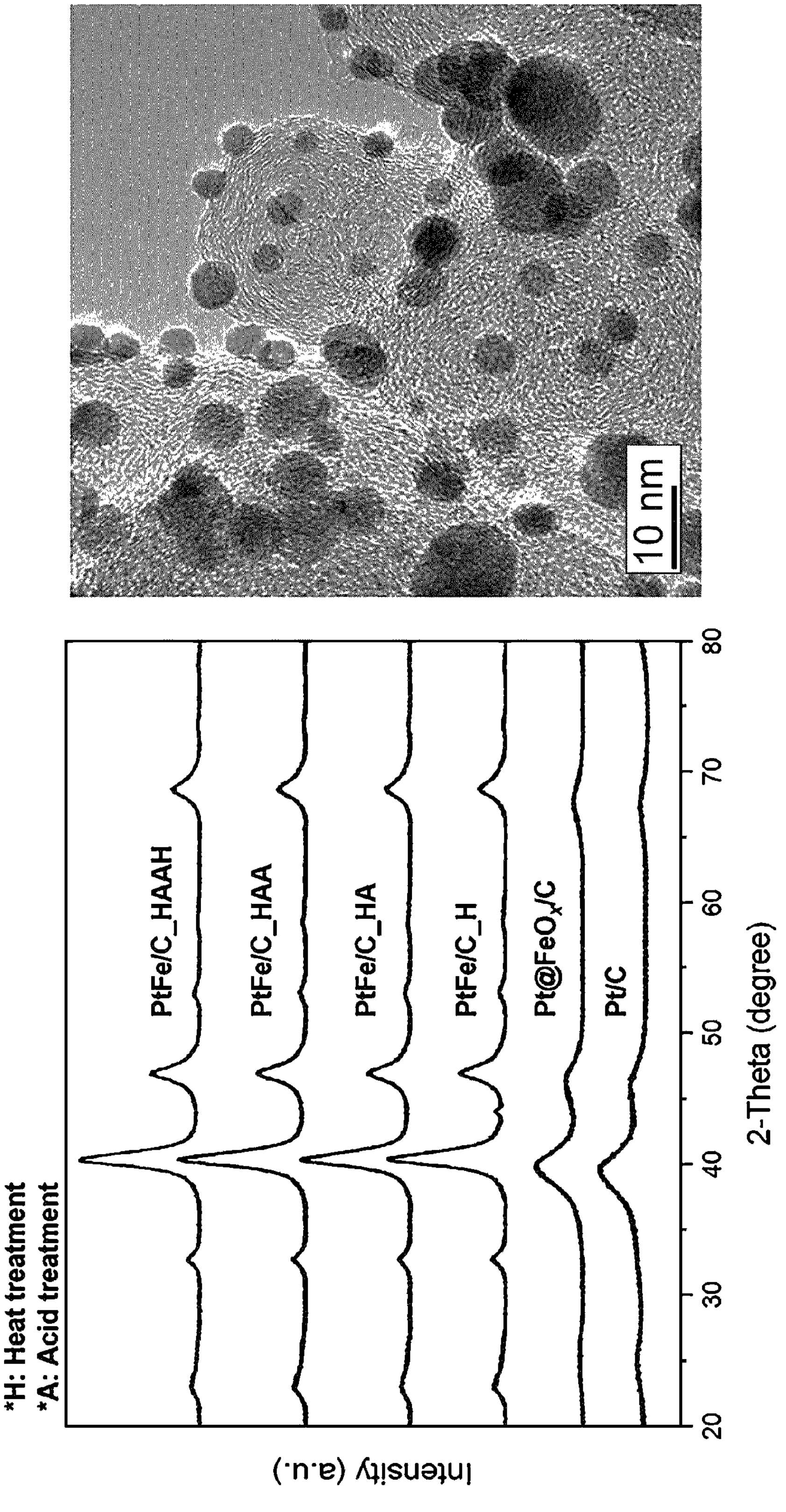
FIG. 14 shows XRD and TEM analysis results of a platinum alloy catalyst prepared using the Fe precursor of the present disclosure.
Figure 15:
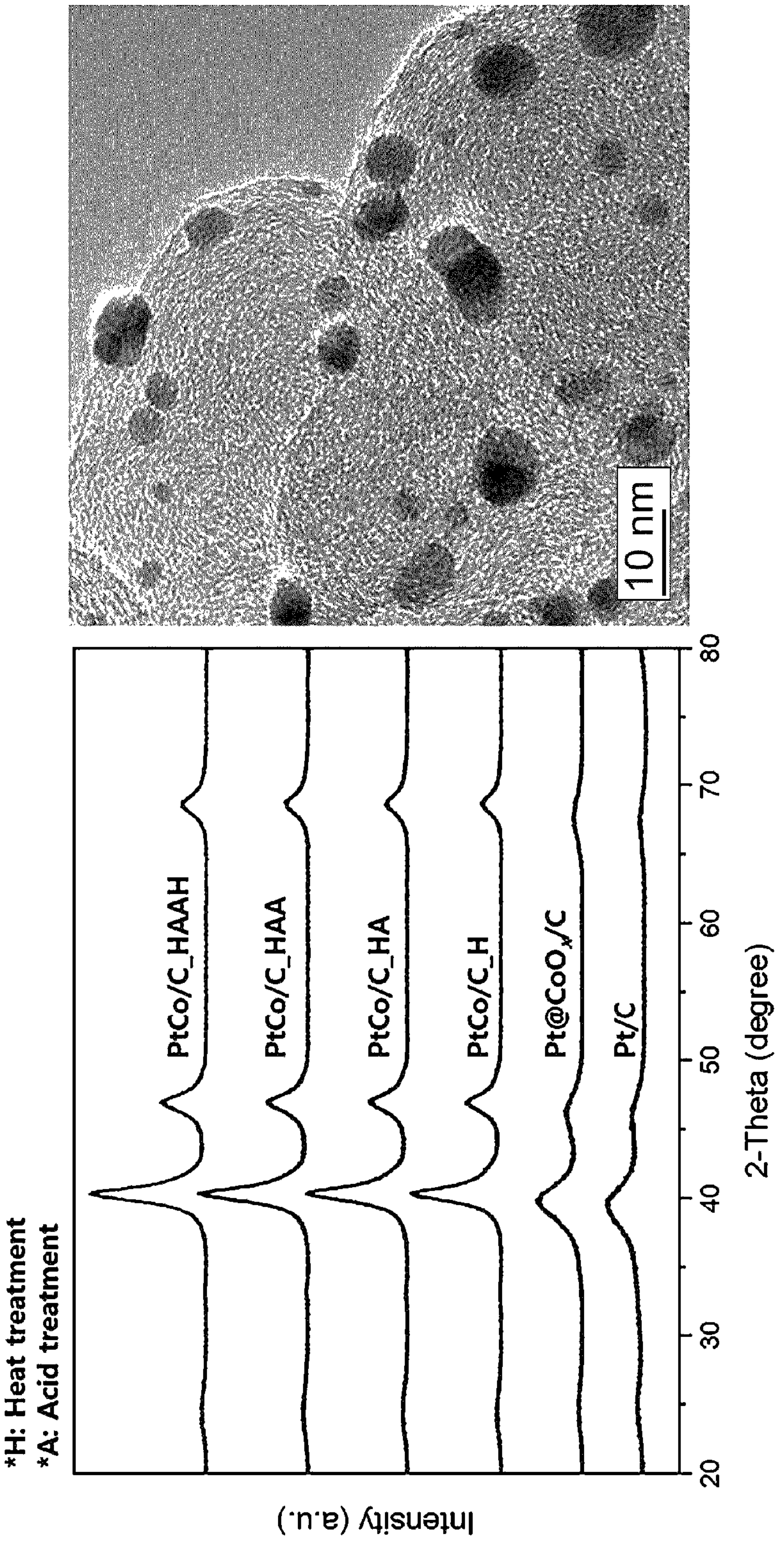
FIG. 15 shows XRD and TEM analysis results of a platinum alloy catalyst prepared using the Co precursor of the present disclosure.
Figure 16:
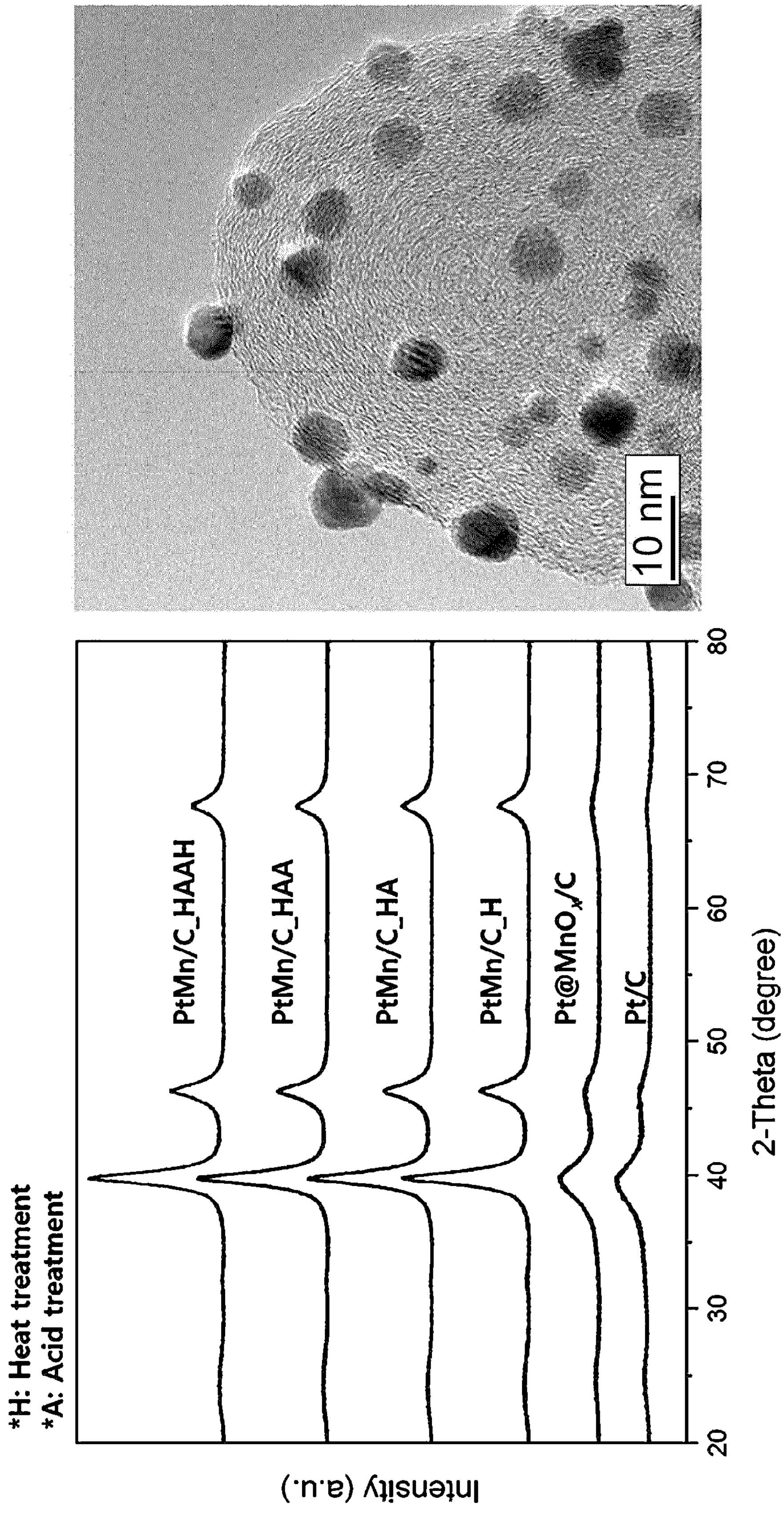
FIG. 16 shows XRD and TEM analysis results of a platinum alloy catalyst prepared using the Mn precursor of the present disclosure.
Figure 17:
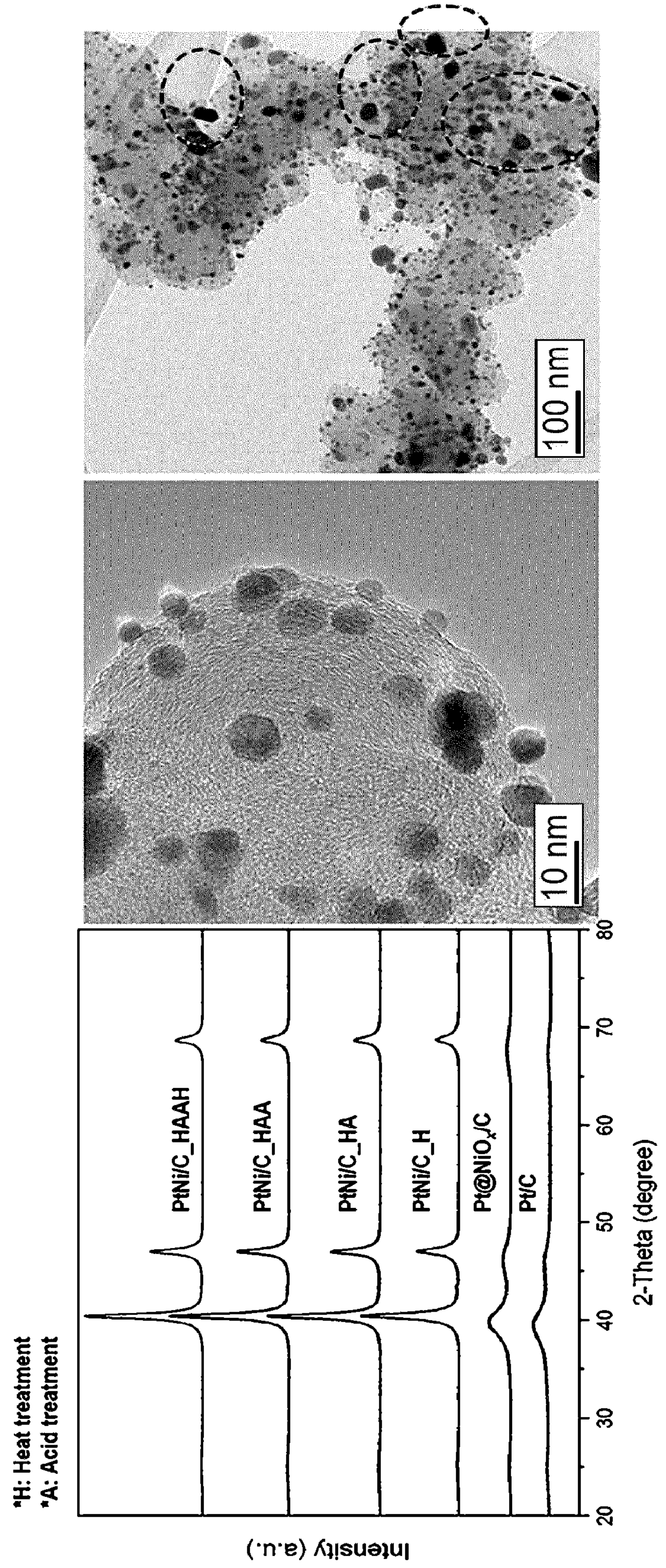
FIG. 17 shows XRD and TEM analysis results of a platinum alloy catalyst prepared using the Ni precursor of the present disclosure.

<Experimental Example 5> XRD and TEM Analysis Results According to Transition Metal Types FIG. 14 shows XRD and TEM analysis results of a platinum alloy catalyst prepared using the Fe precursor of the present disclosure, FIG. 15 shows XRD and TEM analysis results of a platinum alloy catalyst prepared using the Co precursor of the present disclosure, FIG. 16 shows XRD and TEM analysis results of a platinum alloy catalyst prepared using the Mn precursor of the present disclosure, and FIG. 17 shows XRD and TEM analysis results of a platinum alloy catalyst prepared using the Ni precursor of the present disclosure.

First, the XRD and particle analysis results of the platinum alloy catalyst (PtFe alloy catalyst) prepared using the Fe precursor according to Example 1 of the present disclosure are shown in Table 3 below.

In the case of secondary acid treatment, when the acid treatment process of the fourth step (S400) of the present disclosure is repeatedly performed twice, it may be divided into a primary acid treatment and a secondary acid treatment.

TABLE 3

| Sample name | Pt-Pt distance (nm) Pt-Pt distance (nm) | Particle size (nm) XRD (220) | TEM | Remarks — |
|---|---|---|---|---|
| Pt/C | 0.2781 | 2.45 | 3.08 ± 0.44 | — |
| Pt@$FeO_x$/C | 0.2769 | 2.74 | 3.24 ± 0.40 | Immediately after ultrasonic synthesis |
| PtFe/C_H | 0.2732 | 5.22 | — | Primary heat treatment |
| PtFe/C_HA | 0.2733 | 5.18 | — | Primary acid treatment |
| PtFe/C_HAA | 0.2733 | 5.19 | — | Secondary acid treatment |
| PtFe/C_HAAH | 0.2733 | 5.13 | 5.26 ± 1.57 | Secondary heat treatment |

Referring to FIG. 14 and Table 3, through ultrasonic synthesis, it could be confirmed that the oxide layer located on the surface of the platinum particles provides a role of supplying a transition metal for forming a PtFe alloy together with a role of suppressing the growth of the particle size during the primary heat treatment. In addition, in order to completely remove oxides remaining on the surface of the alloy particles without being alloyed in the primary heat treatment process, the acid treatment process was repeatedly performed twice in total.

That is, it could be confirmed through XRD analysis that the Pt—Pt distance decreased compared to the Pt/C catalyst as the PtFe alloying progressed in the synthesis process.

Finally, a secondary heat treatment was performed to form a platinum shell on the surface of the PtFe alloy, and it could be confirmed through STEM-HAADF and STEM-EDS line analysis that about two layers of platinum shell were formed and the core was in the form of an alloy.

Next, XRD and particle analysis results of the platinum alloy catalyst (PtCo alloy catalyst) prepared using the Co precursor according to Example 4 of the present disclosure are shown in Table 4 below.

TABLE 4

| Sample name | Pt-Pt distance (nm) Pt-Pt distance (nm) | Particle size (nm) XRD (220) | TEM | Remarks — |
|---|---|---|---|---|
| Pt/C | 0.2781 | 2.45 | 3.08 ± 0.44 | — |
| Pt@CoO$_x$/C | 0.2771 | 2.74 | 3.12 ± 1.16 | Immediately after ultrasonic synthesis |
| PtCo/C_H | 0.2735 | 5.22 | 5.71 ± 1.28 | Primary heat treatment |
| PtCo/C_HA | 0.2735 | 5.18 | — | Primary acid treatment |
| PtCo/C_HA A | 0.2735 | 5.19 | — | Secondary acid treatment |
| PtCo/C_HA AH | 0.2736 | 5.13 | 5.98 ± 1.47 | Secondary heat treatment |

Referring to FIG. 15 and Table 4, Pt@CoOx/C was prepared using ultrasonic waves, and a PtCo alloy catalyst was finally prepared through the same preparation process. Through this ultrasonic synthesis, it could be confirmed that the cobalt (Co) oxide layer located on the surface of the platinum particles provides a role of supplying a transition metal for forming a PtCo alloy together with a role of suppressing the growth of the particle size during the primary heat treatment.

Further, in order to completely remove the oxides remaining on the surface of the alloy particles without being alloyed in the primary heat treatment process, the acid treatment process was repeatedly performed twice in total. It could be confirmed through XRD analysis that the Pt—Pt distance decreased compared to the Pt/C catalyst as the PtCo alloying progressed in the synthesis process. In addition, it could be confirmed through TEM analysis that a PtCo alloy catalyst having a size of about 5 to 6 nm was prepared.

Next, XRD and particle analysis results of the platinum alloy catalyst (PtMn alloy catalyst) prepared using the Mn precursor according to Example 5 of the present disclosure are shown in Table 5 below.

TABLE 5

| Sample name | Pt-Pt distance (nm) Pt-Pt distance (nm) | Particle size (nm) XRD (220) | TEM | Remarks — |
|---|---|---|---|---|
| Pt/C | 0.2781 | 2.45 | 3.08 ± 0.44 | — |
| Pt@MnO$_x$/C | 0.2777 | 2.31 | 2.79 ± 0.53 | Immediately after ultrasonic synthesis |
| PtMn/C_H | 0.2767 | 5.81 | 5.20 ± 1.42 | Primary heat treatment |
| PtMn/C_HA | 0.2768 | 5.74 | — | Primary acid treatment |
| PtMn/C_HAA | 0.2768 | 5.77 | — | Secondary acid treatment |
| PtMn/C_HAAH | 0.2767 | 5.84 | 5.22 ± 1.78 | Secondary heat treatment |

Referring to FIG. 16 and Table 5, Pt@MnOx/C was prepared using ultrasonic waves, and a PtMn alloy catalyst was finally prepared through the same preparation process. Through this ultrasonic synthesis, it could be confirmed that the manganese (Mn) oxide layer located on the surface of the platinum particles provides a role of supplying a transition metal for forming a PtMn alloy together with a role of suppressing the growth of the particle size during the primary heat treatment.

Further, in order to completely remove the oxides remaining on the surface of the alloy particles without being alloyed in the primary heat treatment process, the acid treatment process was repeatedly performed twice in total. It could be confirmed through XRD analysis that the Pt—Pt distance decreased compared to the Pt/C catalyst as the PtMn alloying progressed in the synthesis process. In addition, it could be confirmed through TEM analysis that a PtMn alloy catalyst having a size of about 5 nm was prepared.

Next, XRD and particle analysis results of the platinum alloy catalyst (PtNi alloy catalyst) prepared using the Ni precursor according to Example 6 of the present disclosure are shown in Table 6 below.

TABLE 6

| Sample name | Pt-Pt distance (nm) Pt-Pt distance (nm) | Particle size (nm) XRD (220) | TEM | Remarks — |
|---|---|---|---|---|
| Pt/C | 0.2781 | 2.45 | 3.08 ± 0.44 | — |
| Pt@NiO$_x$/C | 0.2768 | 2.64 | 2.94 ± 0.75 | Immediately after ultrasonic synthesis |
| PtNi/C_H | 0.2727 | 9.19 | 6.11 ± 1.54 | Primary heat treatment |
| PtNi/C_HA | 0.2730 | 9.93 | — | Primary acid treatment |
| PtNi/C_HAA | 0.2729 | 10.00 | — | Secondary acid treatment |
| PtNi/C_HAAH | 0.2730 | 10.08 | 5.71 ± 1.59 | Secondary heat treatment |

Referring to FIG. 17 and Table 6, Pt@NiOx/C was prepared using ultrasonic waves, and a PtNi alloy catalyst was finally prepared through the same preparation process. Through this ultrasonic synthesis, it could be confirmed that the nickel (Ni) oxide layer located on the surface of the platinum particles provides a role of supplying a transition metal for forming a PtNi alloy together with a role of suppressing the growth of the particle size during the primary heat treatment.

Further, in order to completely remove the oxides remaining on the surface of the alloy particles without being alloyed in the primary heat treatment process, the acid treatment process was repeatedly performed twice in total. In addition, it could be confirmed through XRD analysis that the Pt—Pt distance decreased compared to the Pt/C catalyst as the PtNi alloying progressed in the synthesis process. It could be confirmed through TEM analysis that a PtNi alloy catalyst having a size of about 5 to 6 nm was prepared. In the XRD analysis result, the particle size was calculated to be a level of 10 nm or less, which can be judged to be due to the particles of about to 30 nm seen in the TEM photograph.

As such, the present disclosure can prepare a platinum alloy catalyst using an oxide coating forming a core-shell structure while having a suitable particle distribution and size through a total of two acid treatments and two heat treatments using platinum and a transition metal.

As described above, the detailed description of the present disclosure has been made by way of Examples, but since the above-described Examples have only been described with preferred examples of the present disclosure, it should not be understood that the present disclosure is limited only to the above-described Examples, and the scope of rights of the present disclosure should be understood as the claims described later and equivalent concepts thereof.

What is claimed is:

1. A method for preparing a platinum transition metal alloy catalyst using an oxide coating, the method comprising:

a first step of preparing a dispersion by mixing a platinum catalyst supported on a carbon support and a precursor of one transition metal selected from the group consisting of Fe, Co, Mn, and Ni with a solvent;

a second step of putting an ultrasonic tip into the dispersion prepared through the first step and performing an ultrasonic process in a nitrogen gas atmosphere for 3 to 5 hours, thereby preparing a catalyst on a carbon support in which a transition metal oxide is coated on a surface of the platinum catalyst;

a third step of performing a primary heat treatment process on the catalyst prepared through the second step at a temperature of 400 to 800° C. for 1 to 2 hours under a reducing gas atmosphere;

a fourth step of performing an acid treatment process on the catalyst that has undergone the primary heat treatment process through the third step at a temperature of 70 to 95° C. for 1 to 2 hours; and a fifth step of preparing the platinum transition metal alloy catalyst by performing a secondary heat treatment process on the catalyst that has undergone the acid treatment process through the fourth step at a temperature of 400 to 800° C. for 2 to 3 hours under a reducing gas atmosphere.

2. The method of claim 1, wherein in the first step, the dispersion is prepared by mixing 10 to 60 parts by weight of the platinum catalyst on a carbon support and 2.5 to 15 parts by weight of the transition metal precursor, based on 100 parts by weight of the solvent.

3. The method of claim 1, wherein in the second step, the ultrasonic tip is put into the dispersion prepared through the first step, the ultrasonic process is performed at a temperature of 140 to 160° C. for 3 to 5 hours in a nitrogen gas atmosphere, and a post-treatment process is performed after completing the ultrasonic process.

4. The method of claim 3, wherein the post-treatment process in the second step prepares a catalyst by sequentially stirring the ultrasonic process-completed dispersion with ethanol and distilled water, respectively, washing the stirred dispersion using a filter, and then vacuum-drying the washed dispersion at a temperature of 50 to 70° C. for 20 to 28 hours using a vacuum drying device.

5. The method of claim 1, wherein in the third step, the catalyst prepared through the second step is divided and placed into a boat made of aluminum to perform the primary heat treatment process at a temperature of 400 to 800° C. for 1 to 2 hours under reducing gas atmosphere conditions.

6. The method of claim 1, wherein in the fourth step, the catalyst that has undergone the primary heat treatment process through the third step is mixed with perchloric acid and ethanol (EtOH) and stirred, the stirred solution is subjected to an acid treatment process at a temperature of 70 to 95° C. for 1 to 2 hours using a heating mantle, the acid treatment process-completed catalyst is sequentially stirred with ethanol and distilled water, respectively, the stirred solution is subjected to a washing process using a filter, and then the washed solution is vacuum dried at a temperature of 50 to 70° C. for 20 to 28 hours using a vacuum drying device to proceed with the post-treatment process, and the acid treatment process and the post-treatment process are repeatedly performed twice.

7. The method of claim 1, wherein in the fifth step, the catalyst that has undergone the acid treatment process through the fourth step is divided and put in a boat made of aluminum to perform the secondary heat treatment process at a temperature of 400 to 800° C. for 2 to 3 hours under reducing gas atmosphere conditions.

* * * * *